United States Patent
Li et al.

(10) Patent No.: US 8,052,406 B2
(45) Date of Patent: Nov. 8, 2011

(54) SCROLL MACHINE HAVING IMPROVED DISCHARGE VALVE ASSEMBLY

(75) Inventors: Feng E. Li, Jiangsu (CN); Jin Zhang, Jiangsu (CN); Samuel P. Busching, St. Charles, MO (US); Shane J. Angle, Troy, OH (US); William P. Tobe, Rossburg, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 1028 days.

(21) Appl. No.: 11/939,886

(22) Filed: Nov. 14, 2007

(65) Prior Publication Data
US 2008/0115357 A1 May 22, 2008

Related U.S. Application Data

(60) Provisional application No. 60/859,295, filed on Nov. 15, 2006, provisional application No. 60/922,202, filed on Apr. 6, 2007.

(51) Int. Cl.
F01C 1/02 (2006.01)
F01C 1/063 (2006.01)
F03C 2/02 (2006.01)
F04C 2/02 (2006.01)
B23P 15/00 (2006.01)
F16K 25/00 (2006.01)
F16L 21/06 (2006.01)

(52) U.S. Cl. ........ 418/55.1; 29/888.022; 137/454.4; 285/322; 285/323; 285/340; 403/372; 403/316; 403/319

(58) Field of Classification Search .......... 418/55.1, 418/270; 29/888.022; 137/454.2, 454.4; 285/322, 323, 340; 403/372, 316, 319
See application file for complete search history.

(56) References Cited

U.S. PATENT DOCUMENTS

| | | | | |
|---|---|---|---|---|
| 4,035,005 A * | 7/1977 | DeVincent et al. | ........... | 285/319 |
| 4,885,429 A * | 12/1989 | Schnittker | ............ | 174/668 |
| 4,981,390 A * | 1/1991 | Cramer et al. | ............ | 403/372 |
| 5,173,042 A | 12/1992 | Chambers | | |
| 5,988,705 A * | 11/1999 | Norkey | ............ | 285/319 |
| 6,027,321 A * | 2/2000 | Shim et al. | ............ | 418/270 |
| 6,059,826 A * | 5/2000 | Bokros et al. | ............ | 623/2.11 |
| 6,499,771 B1 * | 12/2002 | Snyder et al. | ............ | 285/340 |
| 6,749,412 B2 | 6/2004 | Narasipura et al. | | |
| 6,913,292 B2 * | 7/2005 | Snyder et al. | ............ | 285/340 |
| 2005/0232798 A1 * | 10/2005 | Alexander et al. | ............ | 418/55.1 |
| 2006/0233657 A1 | 10/2006 | Bonear et al. | | |

FOREIGN PATENT DOCUMENTS

JP 2006300051 11/2006
KR 20020040972 5/2002

OTHER PUBLICATIONS

Office Action from State Intellectual Property Office of People's Republic of China for Chinese Application No. 200780042602.1 dated Jun. 22, 2011.*
Written Opinion of the International Searching Authority dated Apr. 23, 2008 regarding International Application No. PCT/US2007/023802.
International Search Report dated Apr. 23, 2008 regarding International Application No. PCT/US2007/023802.
International Preliminary Report on Patentability regarding International Application No. PCT/US2007/023802 dated May 19, 2009.

* cited by examiner

*Primary Examiner* — Mary A Davis
(74) *Attorney, Agent, or Firm* — Harness, Dickey & Pierce, P.L.C.

(57) ABSTRACT

A valve retainer is provided for securably retaining a discharge valve assembly within a recess formed in a scroll. The valve retainer can be installed between the recess of the non-orbital scroll and the discharge valve assembly to retain the discharge valve assembly at the recess. The valve retainer can include a ring-like body having inwardly and/or outwardly extending tangs for cooperating with structure formed on the respective valve and the recess of the non-orbital scroll.

15 Claims, 24 Drawing Sheets

SCROLL MACHINE HAVING IMPROVED DISCHARGE VALVE ASSEMBLY

CROSS-REFERENCE TO RELATED APPLICATIONS

This application claims the benefit of U.S. Provisional Application No. 60/859,295 filed on Nov. 15, 2006 and U.S. Provisional Application No. 60/922,202 filed on Apr. 6, 2007.

FIELD

The present disclosure relates to scroll compressors, and more particularly, to a scroll compressor having an improved discharge valve assembly.

BACKGROUND AND SUMMARY

Scroll compressors have become widely utilized in many refrigerant compression applications. Scroll compressors are relatively efficient, and are being utilized in more and more applications. In a typical scroll compressor, the compression chambers are defined by two generally spiral wraps. The spiral wraps are formed on individual scroll members, and extend from a base plate. The spiral wraps interfit to define compression chambers. One of the spiral wraps is driven to orbit relative to the other, and the size of the compression chambers changes to compress the entrapped refrigerant.

As the compression chamber nears the end of its cycle, the entrapped gas is exposed to a discharge port. The entrapped gas leaves the discharge port and moves through a check valve to a discharge plenum. The discharge check valve is typically opened during operation of the scroll compressor. The check valve closes the discharge port and desirably prevents backflow once the compressor is stopped.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses.

Figure 1:
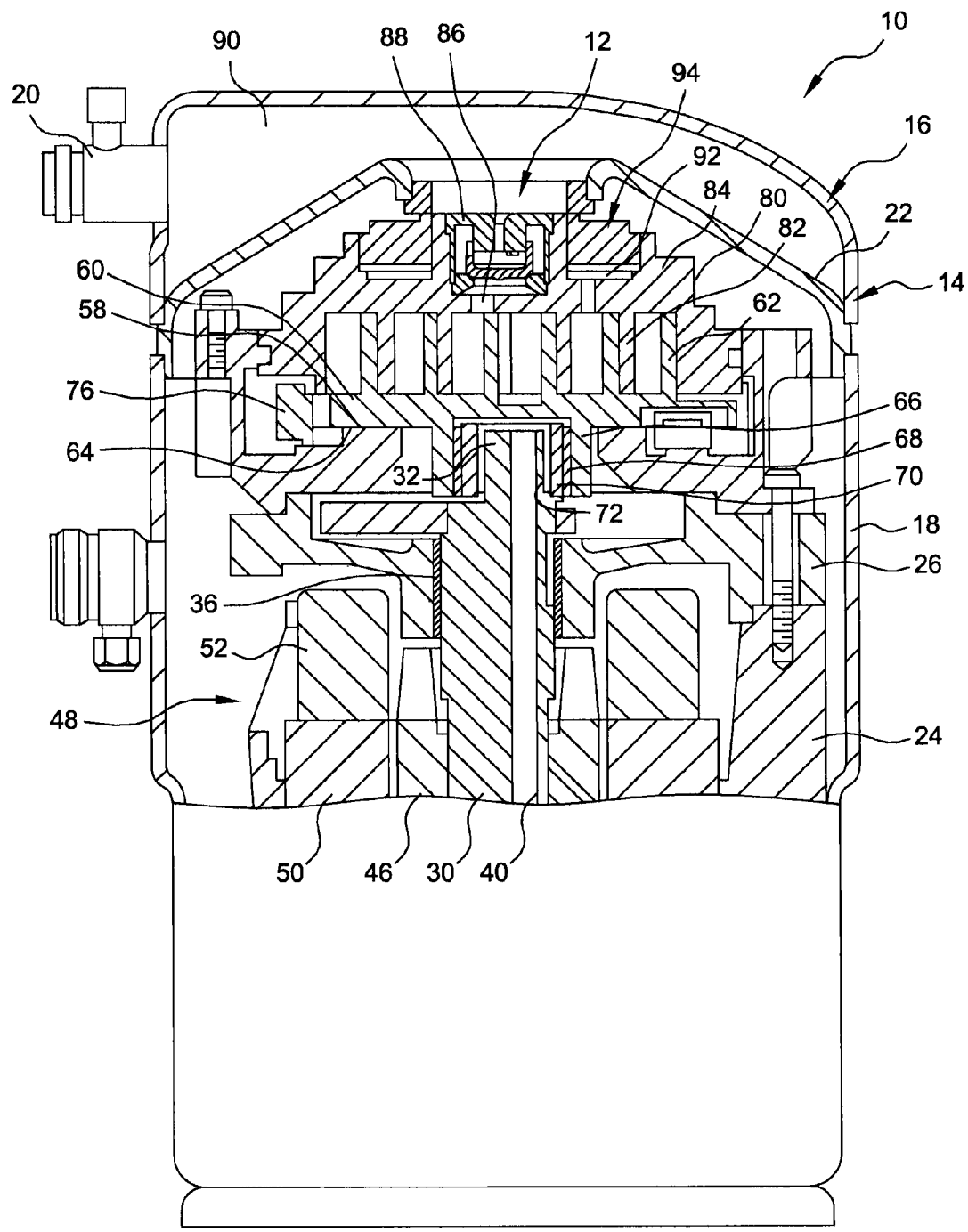
FIG. 1 is a cross-sectional view of a scroll compressor incorporated with a discharge valve, according to the principles of the present disclosure.

Referring now to the drawings in which like reference numerals designate like or corresponding parts throughout the several views, there is shown in FIG. 1 a scroll compressor 10 that incorporates a discharge valve assembly 12 in accordance with the present disclosure. Compressor 10 comprises a generally cylindrical hermetic shell 14 having welded at the upper end thereof a cap 16 and at the lower end thereof a base 18. Cap 16 is provided with a refrigerant discharge fitting 20. Other major elements affixed to shell 14 include a transversely extending partition or muffler plate 22 which is welded to the shell 14 about its periphery. A main bearing housing 24 is suitably secured to shell 14 and a two piece upper bearing housing 26 is suitably secured to main bearing housing 24.

A drive shaft or crank shaft 30 having an eccentric crank pin 32 at the upper end thereof is rotatably journaled in a first bearing (not shown) in main bearing housing 24 and a second bearing 36 in upper bearing housing 26. Crank shaft 30 has at the lower end a relatively large diameter eccentric bore which communicates with a radially outwardly inclined smaller diameter bore 40 extending upwardly therefrom to the top of crankshaft 30. The lower portion of the shell interior defines an oil sump which is filled with lubricating oil to a level slightly above the lower end of a rotor 46, and the eccentric bore acts as a pump to pump lubricating oil up crankshaft 30 and into bore 40 and ultimately to all the various portions of compressor 10 that require lubrication.

Crankshaft 30 is rotatably driven by an electric motor 48 including a stator 50, windings 52 passing therethrough, and rotor 46 being press fit on crankshaft 30 and having an upper counterweight and a lower counterweight (not shown). An upper surface 58 of upper bearing housing 26 is provided with a flat thrust bearing surface on which is disposed an orbiting scroll member 60 having a spiral vein or wrap 62 extending upward from an end plate 64. Projecting downwardly from a lower surface of end plate 64 of orbiting scroll member 60 is a cylindrical hub 66 having a journal bearing 68 therein, and in which is rotatably disposed a drive bushing 70 having an inner bore 72 in which crank pin 32 is drivingly disposed. Crank pin 32 has a flat on one surface that engages a flat surface (not shown) formed in a portion of bore 72 to provide a radially compliant driving arrangement, such as shown in Assignee's U.S. Pat. No. 4,877,382, the disclosure of which is hereby incorporated herein by reference.

An Oldham coupling 76 is also provided and positioned between orbiting scroll member 60 and upper bearing housing 26 and is keyed to orbiting scroll member 60 and a non-orbiting scroll member 80 to prevent rotational movement of orbiting scroll member 60. Oldham coupling 76 is preferably of the type disclosed in Assignee's U.S. Pat. No. 5,320,506, the disclosure of which is hereby incorporated herein by reference.

Non-orbiting scroll member 80 is provided with a wrap 82 extending downwardly from an end plate 84 is positioned in meshing engagement with wrap 62 of orbiting scroll member 60. Non-orbiting scroll member 80 has a centrally disposed discharge passage 86 that communicates with an upwardly open recess 88 that in turn is in fluid communication with a discharge muffler chamber 90 defined by cap 16 and the partition 22. An annular recess 92 is formed in non-orbiting scroll member 80, within which is disposed a floating seal assembly 94. Recesses 88, 92, and floating seal assembly 94 cooperate to define an axial pressure biasing chamber which receives pressurized fluid being compressed by wraps 62, 82 so as to exert an axial biasing force on the non-orbiting scroll member 80 to thereby urge tips of the respective wraps 62, 82, into sealing engagement with opposed end plate surfaces 98, 100 of end plates 64, 84, respectively. Floating seal assembly 94 is preferably of the type described in greater detail in U.S. Pat. No. 5,156,539, the disclosure of which is incorporated herein by reference. Non-orbiting scroll member 80 is designed to be mounted to main bearing housing 24 in a suitable manner such as disposed in the aforementioned U.S. Pat. No. 4,877,382 or 5,102,316, the disclosures of which are incorporated herein by reference.

Figure 2:
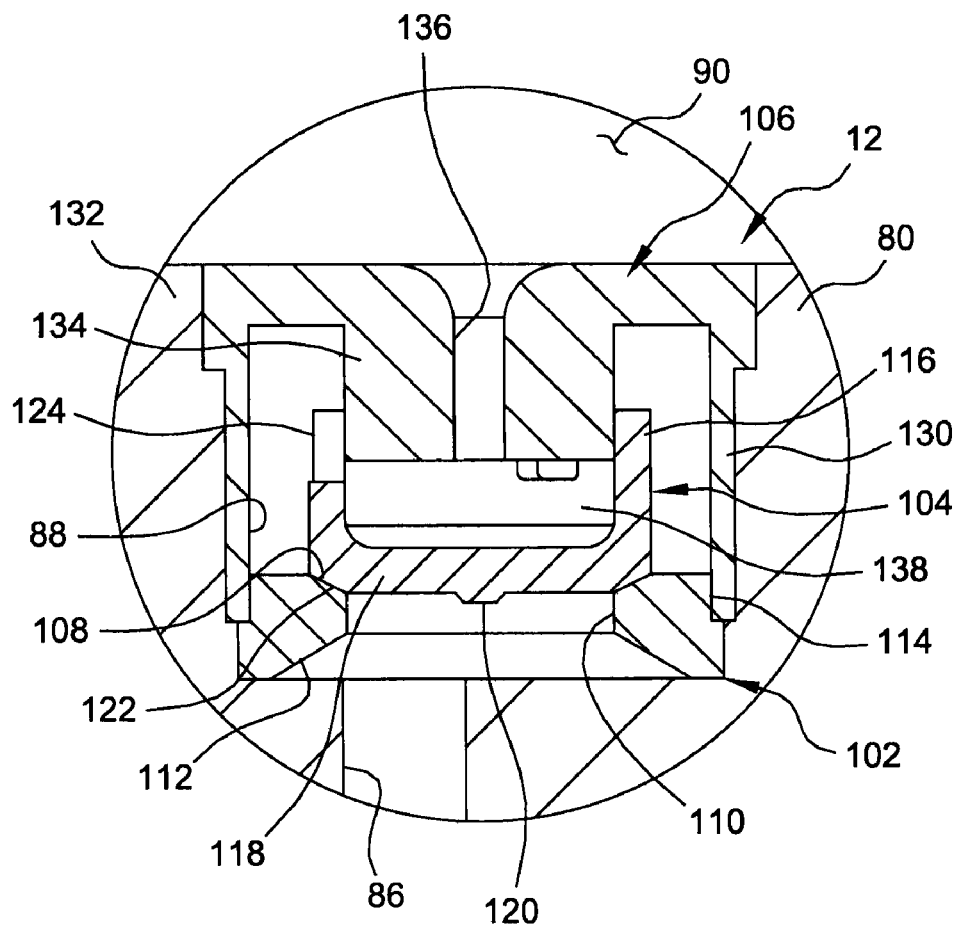
FIG. 2 is a detailed cross-sectional view of the discharge valve shown in FIG. 1.

A normally closed mechanical discharge valve assembly 12 is disposed within recess 88 formed in non-orbiting scroll member 80. Discharge valve assembly 12 moves between a fully closed and a fully opened condition during steady state operation of compressor 10. Valve assembly 12 will close during the shutdown of compressor 10. When valve assembly 12 is fully closed, the recompression volume is minimized and reverse flow of discharge gas through scroll members 60, 80 is prohibited. Valve assembly 12 is normally closed as shown in FIG. 2. The normally closed configuration for valve assembly 12 requires a discharge force (i.e., pressure differential) to open valve assembly 12. Valve assembly 12 relies on the pressure within the discharge muffler chamber 90 to cause the valve 12 to close.

Figure 3:
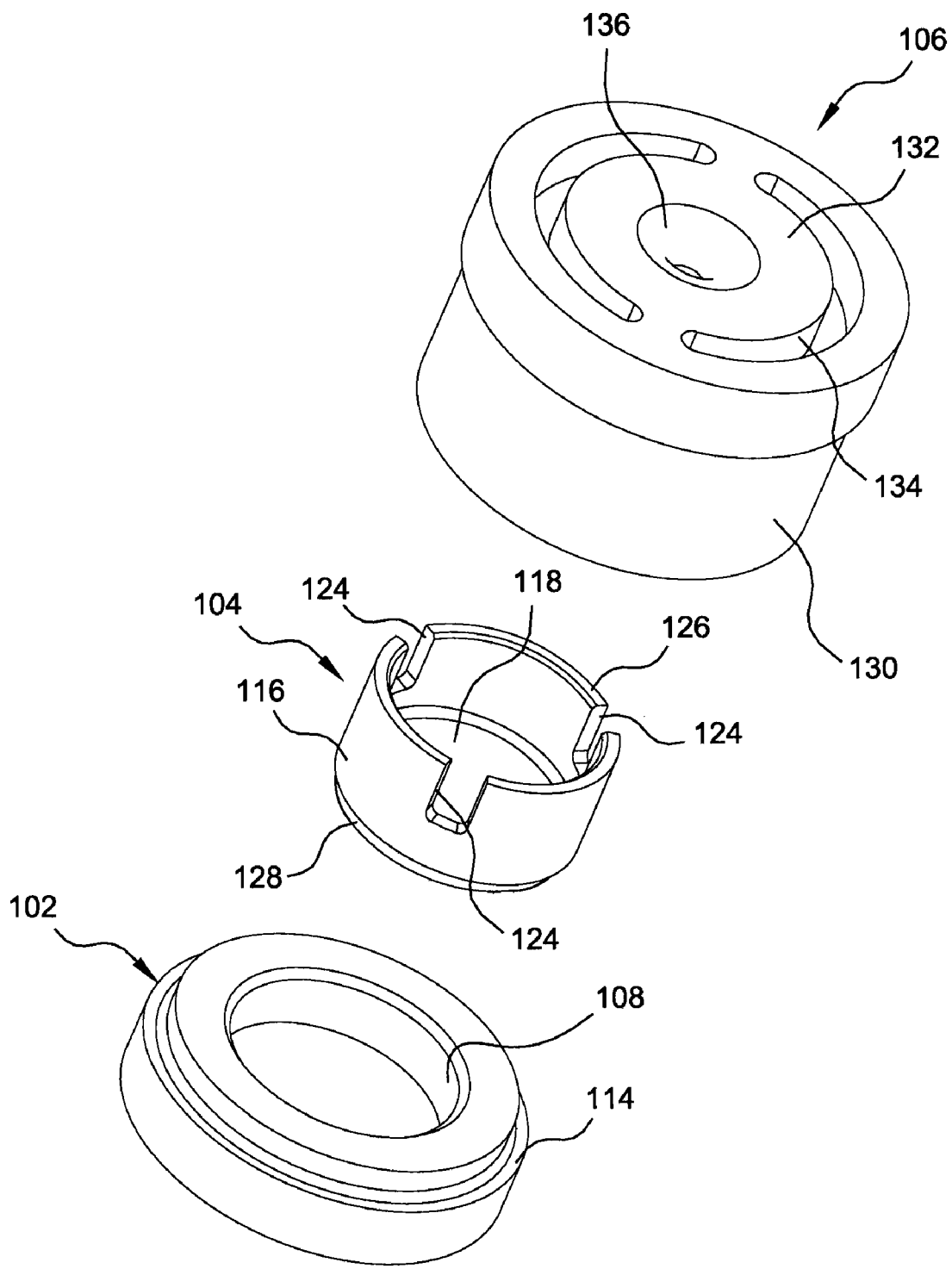
FIG. 3 is an exploded perspective view of the components of the discharge valve shown in FIG. 2.

Referring now to FIGS. 2 and 3, discharge valve assembly 12 includes a valve plate 102 defining a valve seat disposed in the upwardly open recess 88 in the non-orbiting scroll member 80 adjacent to discharge passage 86. A valve member 104 is provided for enclosing the passage through the valve plate 102. A retainer 106 is provided for retaining and guiding movement of the valve member 104.

The valve plate 102 defines a valve seat including a seat surface 108 having a frustoconical shape and facing in a downstream direction from the discharge port 86. The valve plate 102 includes the central aperture 110 adjacent to the seat surface 108. The seat surface 108 is disposed at approximately 50-60 degrees from the axis of the valve plate. An upstream surface 112 of the valve plate 102 is also angularly disposed relative to the axis of the valve plate 102 at approximately 50-60 degrees. The outer perimeter of the valve plate 102 includes a recessed portion 114.

Figure 9:
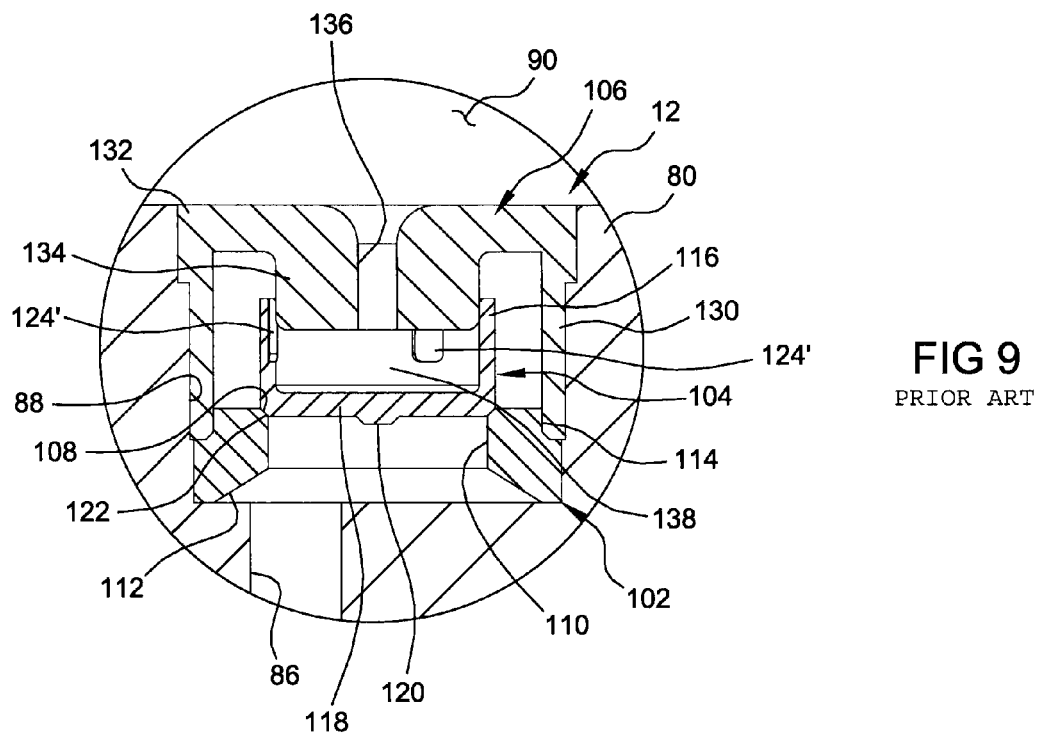
FIG. 9 is a cross-sectional view of a discharge valve according to an alternative embodiment of the present disclosure.
Figure 10:
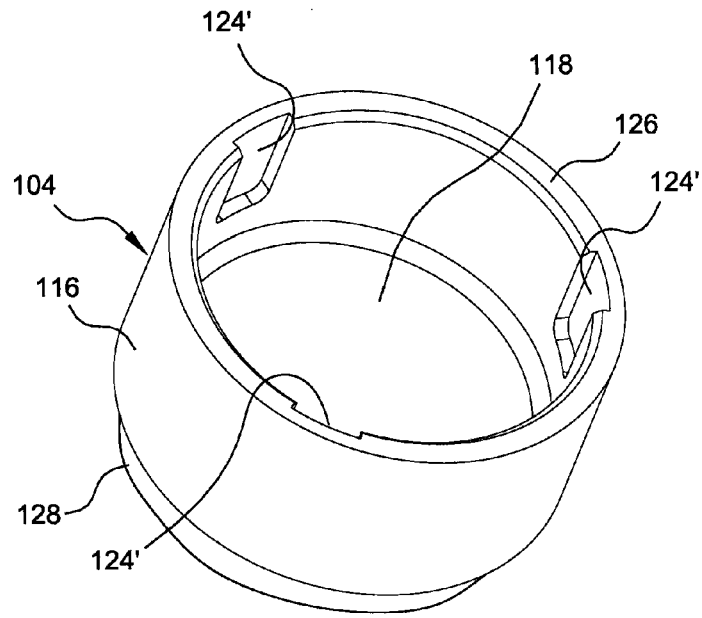
FIG. 10 is a perspective view of the valve member shown in FIG. 9.
Figure 11:
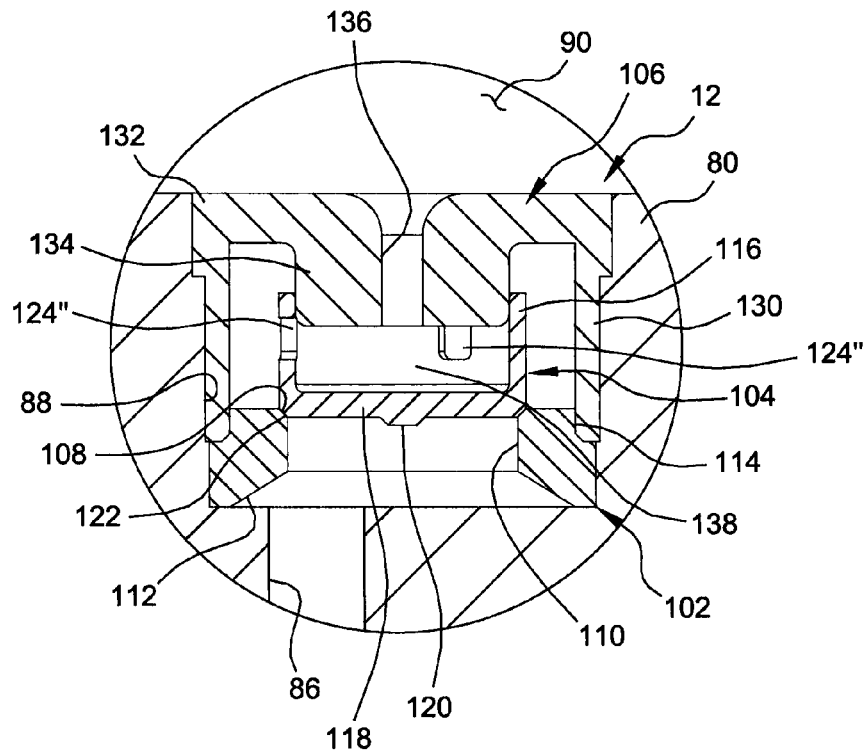
FIG. 11 is a cross-sectional view of a discharge valve according to an alternative embodiment of the present disclosure.
Figure 12:
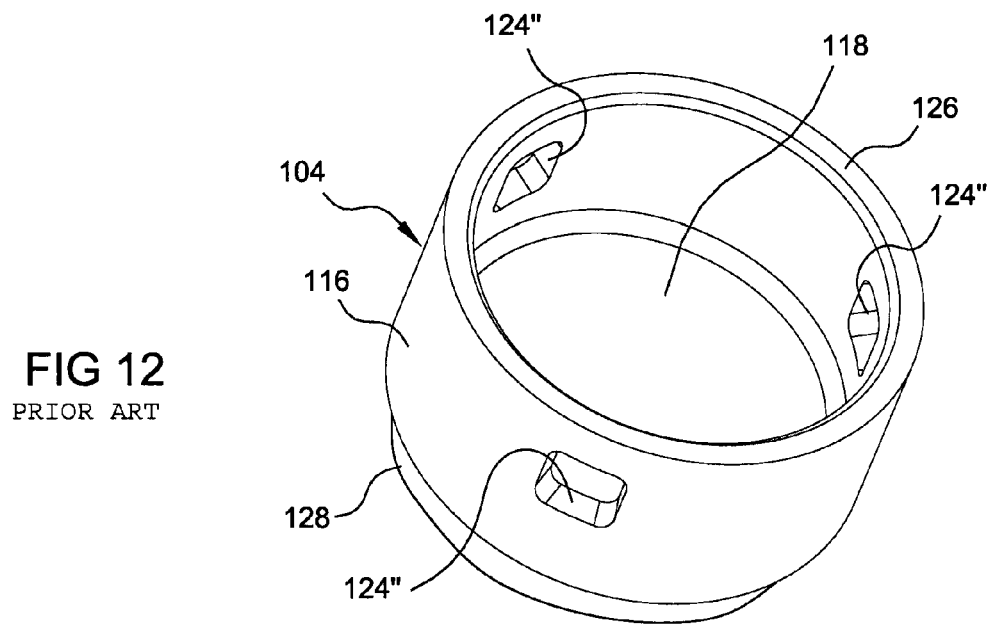
FIG. 12 is a perspective view of the valve member shown in FIG. 11.
Figure 13:
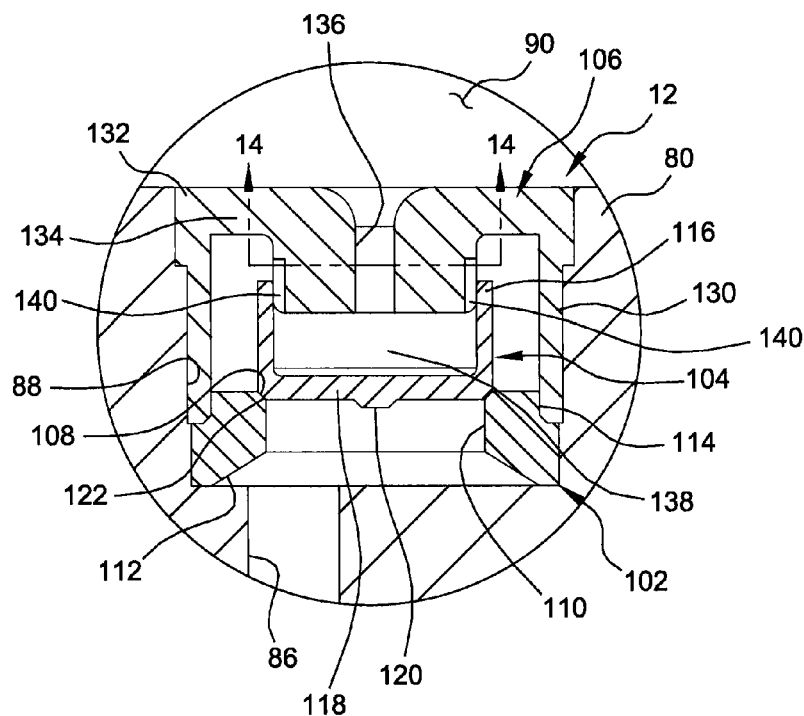
FIG. 13 is a cross-sectional view of a discharge valve according to an alternative embodiment of the present disclosure.
Figure 14:
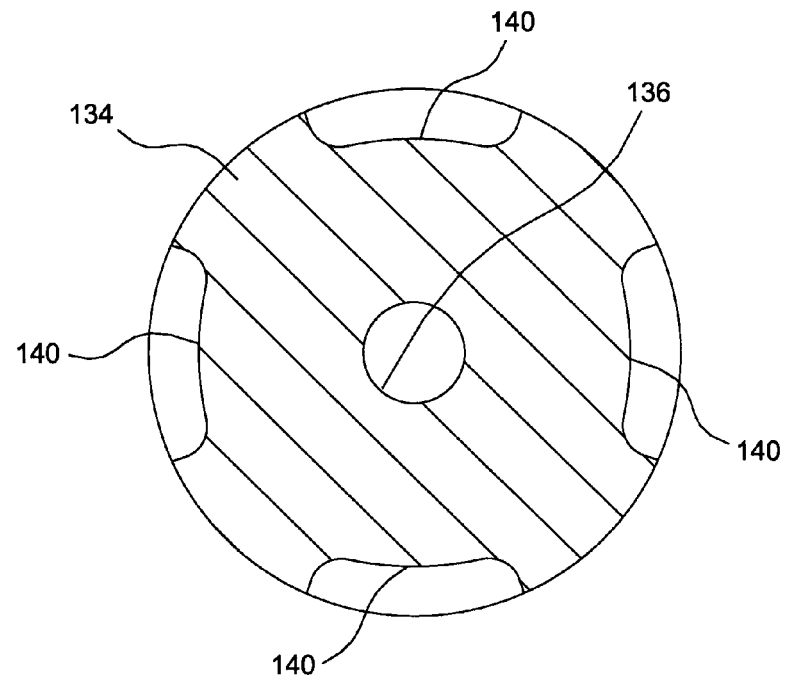
FIG. 14 is a cross sectional view taken along line 14-14 of FIG. 13.

The valve member 104 is generally cup-shaped and includes a generally cylindrical sidewall portion 116 and a base portion 118 enclosing a forward end of the cylindrical sidewall 116. The base portion 118 includes a central nub 120 extending axially therefrom. The outer perimeter of the base portion 118 includes a frusto conical surface 122 between the inner face of the base portion 118 and cylindrical sidewall 116. The frusto conical portion 122 is disposed at approximately 50-60 degrees from the central axis of the valve member. The cylindrical sidewall 116 includes a plurality of equally spaced notches 124 (best seen in FIG. 3) extending axially from a rearward end 126 of the cylindrical sidewall 116 toward a forward end 128 of the cylindrical sidewall. In the embodiment shown in FIG. 3, three notches 124 are provided. As an alternative, slots 124' can be provided in the sidewall 116 as illustrated in FIGS. 9 and 10. As a further alternative, as shown in FIGS. 11 and 12, holes 124" can be provided in the sidewall 116. The holes 124" can be molded in or drilled. The slots 124' and holes 124" provide a rigid sidewall 116 while still providing vent passages therethrough. As a still further alternative, as shown in FIGS. 13 and 14, the stem 134 of the retainer 106 can be provided with recesses 140 while the sidewalls 116 of the valve member 104 is not provided with any venting formations.

The retainer 106 includes a cylindrical outer sidewall 130 and a retainer base portion 132 disposed on a rearward end of the cylindrical outer sidewall 130. A central stem 134 extends axially from the retainer base portion 132 and includes a through hole 136 extending axially therethrough. The valve member 104 is slidably received on the central stem 134 of the retainer 106. Through operation of the scroll compressor 10, the valve member 104 is opened by gas flow from the scroll compressor. The valve member 104 is freely sliding over the stem 134 of the retainer 106. The venting formations 124, 124', 124", 140 provide venting of the space 138 between the valve member 104 and stem 134 which defines a damper cavity on movement of the valve member 104. When the valve member 104 is opening, the gas in the valve cavity 138 is being compressed and leaks away through the restriction hole 136 and stem 134 radial clearance. This causes the pressure in the valve cavity to increase, therefore reducing the valve velocity and impact on the retainer 106. After gas communication through the venting formations 124, 124', 124", 140 have been shut off, gas flow to or from the damper cavity is restricted by the valve 104 and stem 134 radial clearance. During a fraction of a revolution, when there is a negative pressure drop across the valve which causes the valve member to go down, pressure in the valve cavity is being reduced due to its increasing volume and pressure drop across the hole 136 and stem 134 radial clearance, reducing the valve velocity and introducing a delay in valve closing.

Figure 4:
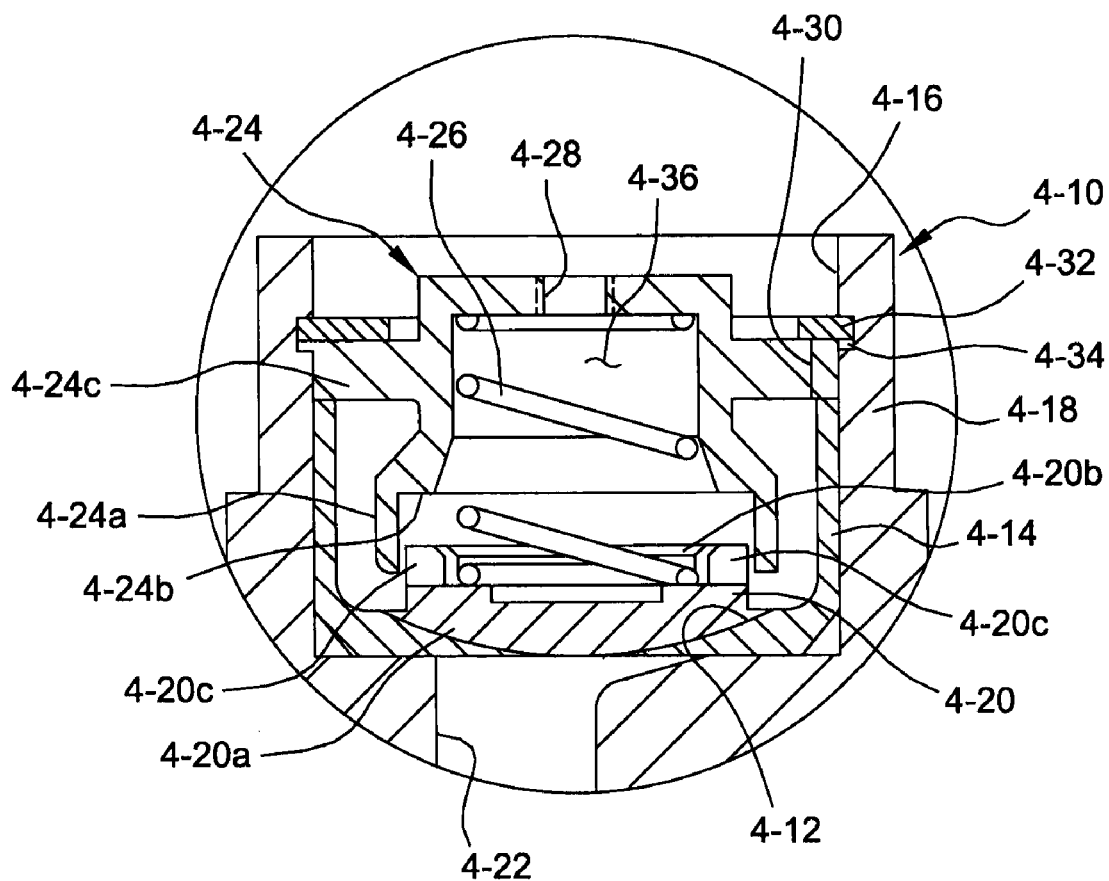
FIG. 4 is a cross-sectional view of a discharge valve according to an alternative embodiment of the present disclosure.

With reference to FIG. 4, an alternate embodiment of the discharge valve 4-10 is shown. The discharge valve 4-10 includes a valve seat 4-12 including a cylindrical sidewall portion 4-14 received in the upwardly extending recess 4-16 of the fixed scroll member 4-18. A valve member 4-20 is provided adjacent to the valve seat 4-12 and a discharge passage 4-22. The valve member 4-20 includes a disk-shaped body portion 4-20a with a rearwardly extending cylindrical wall portion 4-20b. A plurality of notches 4-20c are provided in the cylindrical wall portion 4-20b. A valve retainer 4-24 including a cup-shaped body portion 4-24a having a shoulder portion 4-24b against which the valve member 4-20 abuts. A spring 4-26 is provided in the cup-shaped body portion 4-24a and biases the valve member 4-20 against the valve seat 4-12. A passage 4-28 is provided generally centrally located in the base of the cup-shaped portion 4-24a. The retainer 4-24 includes a radially extending flange portion 4-24c. The flange portion 4-24c includes passages 4-30 spaced circumferentially around the flange 4-24c to allow the discharge of compressed gas to pass therethrough. The retainer 4-24 is retained in place by a clip 4-32 which is received in a groove 4-34 in the sidewall of the recess 4-16. During operation, when the valve member 4-20 starts to open, gases in the volume 4-36 flow through the notches 4-20c and hole 4-28 in order to provide for rapid opening of the valve. When the notches 4-20c are closed off by the cup-shaped body portion 4-24a of the valve retainer 4-24, the flow only passes through the hole 4-28 and the radial clearance between the valve 4-20 and retainer 4-24. The reduced flow provides more dampening which reduces the impact between the valve member 4-20 and the shoulder 4-28b of valve retainer 4-28.

When the valve member 4-20 starts to close, the valve member 4-20 begins to move rapidly under pressure in the volume 4-36 and the spring 4-26. When the notches 4-20c open to allow a flow passage, the pressure in the volume 4-36 drops rapidly and reduces the force pressing down on the valve member 4-20 so that the impact of the valve member 4-20 and valve seat 4-12 is reduced.

Figure 5A:
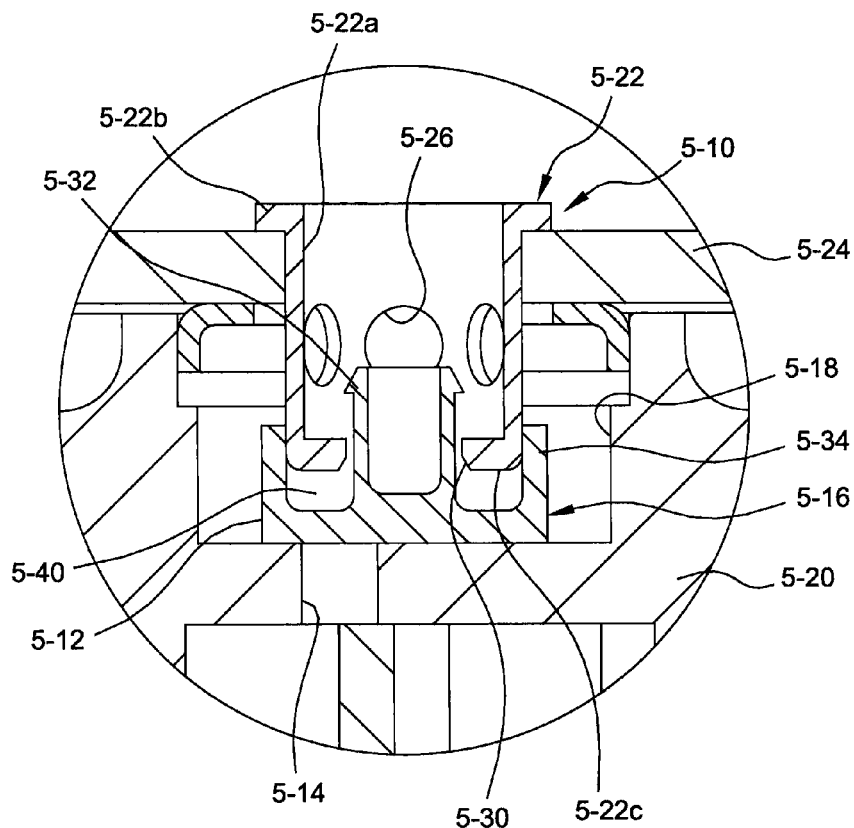
FIG. 5A is a cross-sectional view of a discharge valve according to an alternative embodiment of the present disclosure.
Figure 5B:
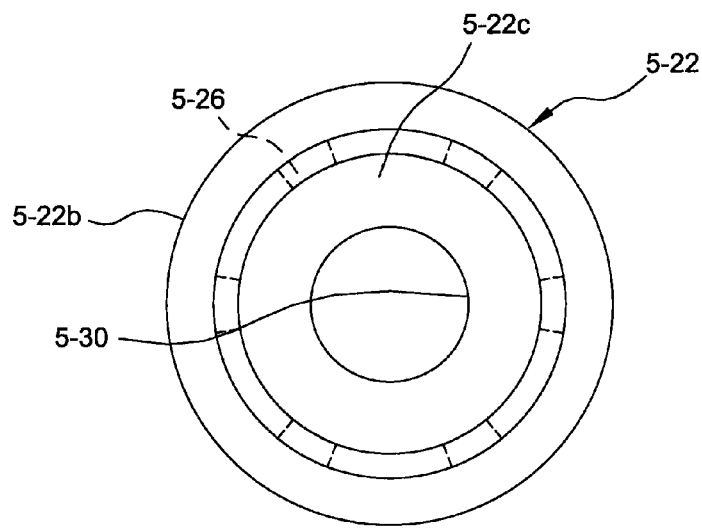
FIG. 5B is a top view of the valve retainer shown in FIG. 5A.

With reference to FIGS. 5A-5B, another embodiment of the discharge valve member 5-10 will now be described. The discharge valve 5-10 includes a valve seat surface 5-12 disposed adjacent to discharge opening 5-14. A valve member 5-16 is provided in the upwardly open recess portion 5-18 of the fixed scroll member 5-20. A valve retainer 5-22 is supported by a partition plate 5-24. The retainer includes a cylindrical wall portion 5-22a having radially extending apertures 5-26 extending therethrough. A radial flange 5-22b extends radially outward from the cylindrical sidewall 5-22a which is disposed against the partition plate 5-24. A radially inwardly extending flange portion 5-22c extends from the upstream end of the cylindrical sidewall portion 5-22a and defines an opening 5-30 for receiving a central lug portion 5-32 of the valve member 5-16. The valve member 5-16 includes a cylindrical outer wall portion 5-34 which has an inner surface which receives the outer surface of the retainer member 5-22. The valve member 5-16 is exposed to a back pressure through the retainer 5-22 that causes the valve member 5-16 to close when the compressor is shut down. The space 5-40 between the valve member 5-16 and the inwardly extending flange portion 5-22c dampens the movement of the valve member 5-16 during pressure fluctuations.

Figure 6A:
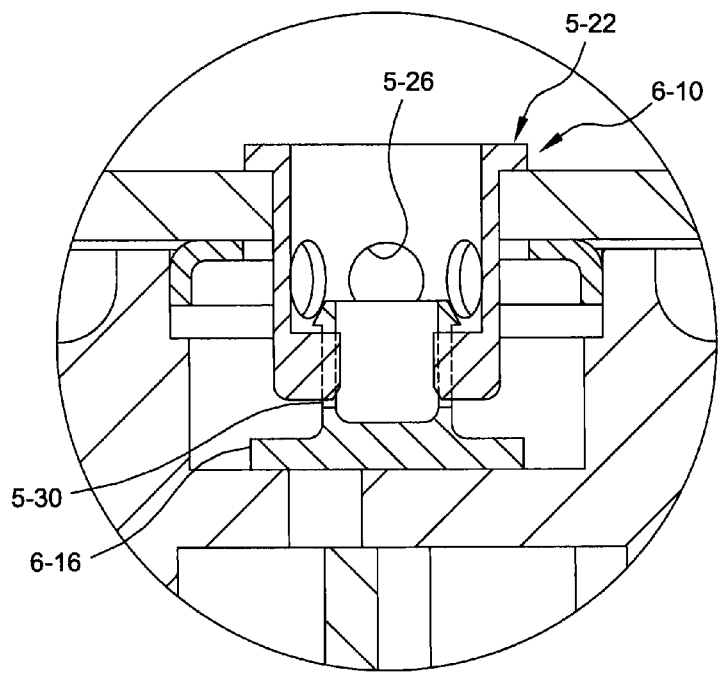
FIG. 6A is a cross-sectional view of a discharge valve according to yet another embodiment of the present disclosure.
Figure 6B:
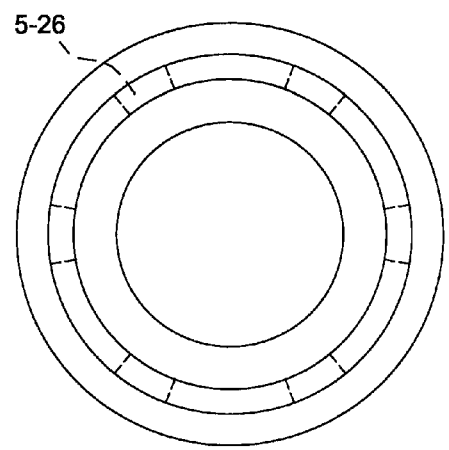
FIG. 6B is a top view of the retainer shown in FIG. 6A.

With reference to FIG. 6A, the valve assembly 6-10 is substantially the same as the valve assembly 5-10 with the exception that the valve member 6-16 includes a sliding fit with the hole 5-30 in the valve retainer 5-22, and the valve member 6-16 does not include an outer cylindrical surface such as cylindrical surface 5-34 of the valve member 5-16. With this arrangement, the sliding engagement of the valve member 6-16 and retainer 5-22 dampens movement of the valve member 6-16.

Figure 7A:
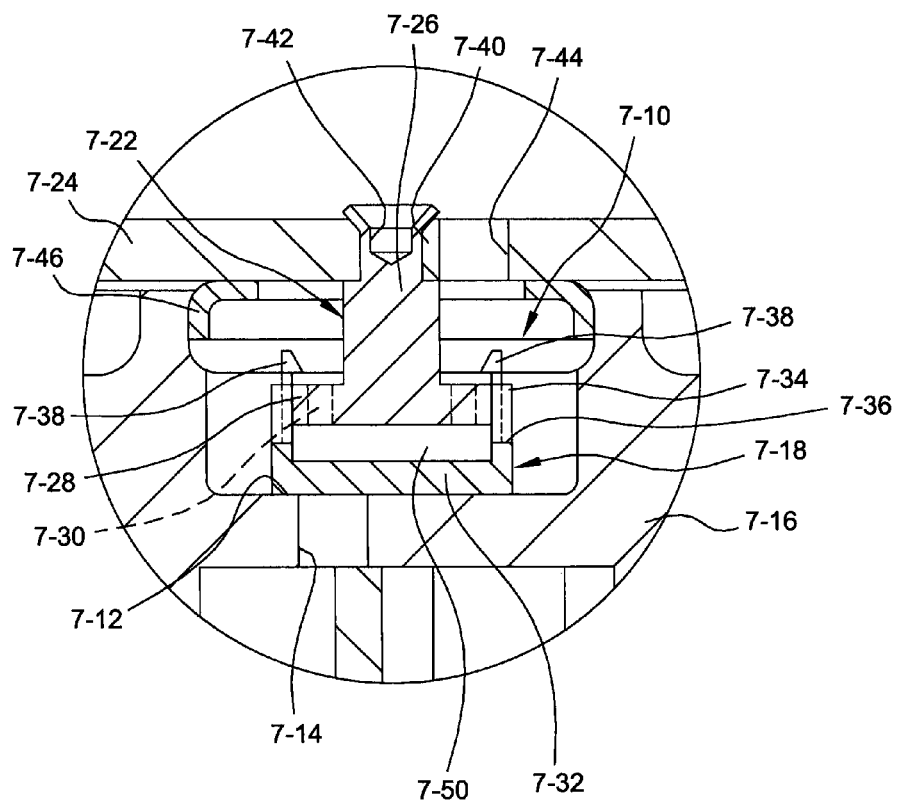
FIG. 7A is a cross-sectional view of still another embodiment of the discharge valve according to the principles of the present disclosure.
Figure 7B:
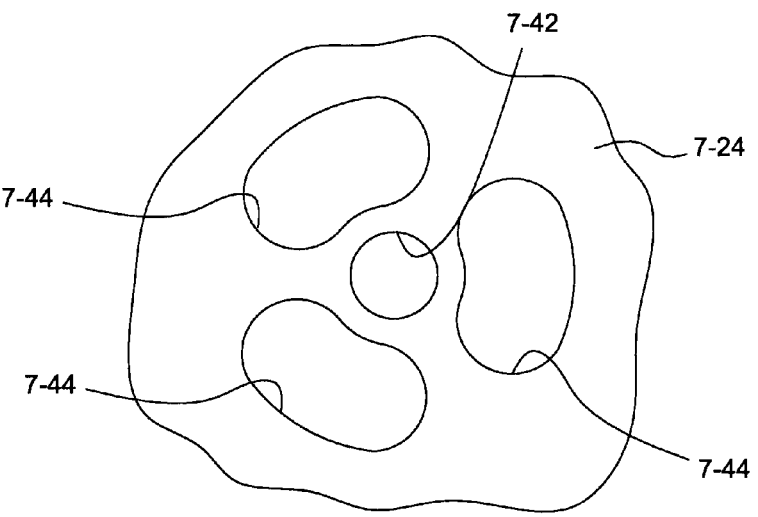
FIG. 7B is a plan view of the slots formed in the muffler plate.

With reference to FIGS. 7A-7B, another embodiment of the discharge valve 7-10 will now be described. The discharge valve 7-10 includes a valve seat surface 7-12 disposed adjacent to discharge opening 7-14 provided in the fixed scroll 7-16. A valve member 7-18 is provided in the upwardly open recess portion 7-20 of the fixed scroll member 7-16. A valve retainer 7-22 is supported by the muffler plate 7-24. The retainer 7-22 includes an elongated base portion 7-26 attached at one end to the muffler plate 7-24 and having at a second end thereof a radially extending flange portion 7-28. The radially extending flange portion 7-28 includes apertures 7-30 extending therethrough. The valve member 7-18 includes a generally flat base portion 7-32 with a cylindrical sidewall 7-34 extending rearwardly therefrom. The cylindrical sidewall 7-34 is provided with recessed notches 7-36 spaced about the cylindrical sidewall.

The radially extending flange portion 7-28 is received within the cylindrical extending sidewall 7-34 of the valve member so that the valve member is capable of moving axially relative to the retainer 7-22. The valve member 7-18 is optionally provided with radially inwardly extending fingers 7-38 which retain the valve member 7-18 to the retainer 7-22 during installation of the valve assembly 7-10. The retainer 7-22 has an end portion 7-40 which is received in an aperture 7-42 and is crimped radially outwardly in order to retain the retainer 7-22 to the muffler plate 7-24. The muffler plate further includes apertures 7-44, as best illustrated in FIG. 7B, for allowing discharge of compressed gas through the muffler plate 7-24. A seal ring 7-46 is disposed between the fixed scroll 7-16 and the muffler plate 7-24. During operation, the space 7-50 between the valve member 7-18 and the retainer 7-22 dampens movement of the valve member 7-18.

Figure 8A:
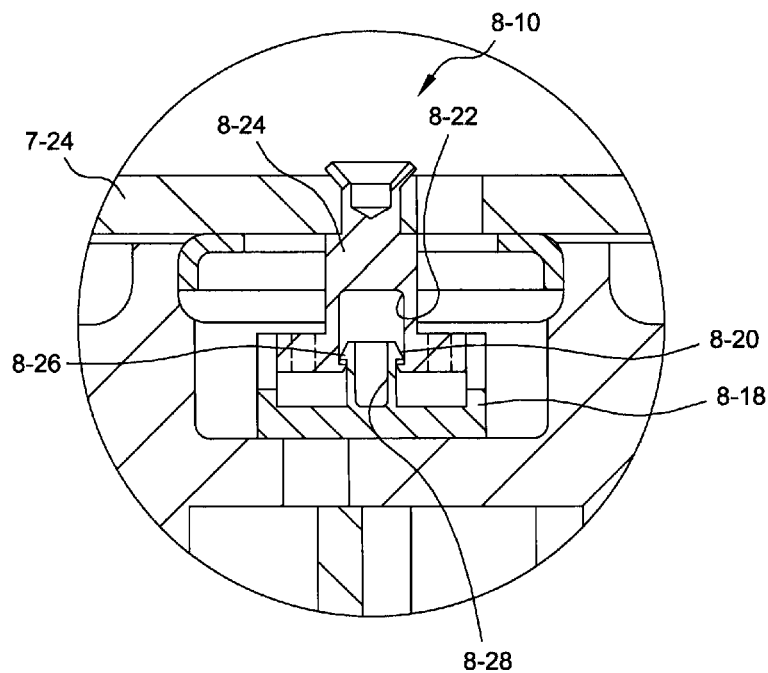
FIG. 8A is a cross-sectional view of still another embodiment of the discharge valve according to the principles of the present disclosure.
Figure 8B:
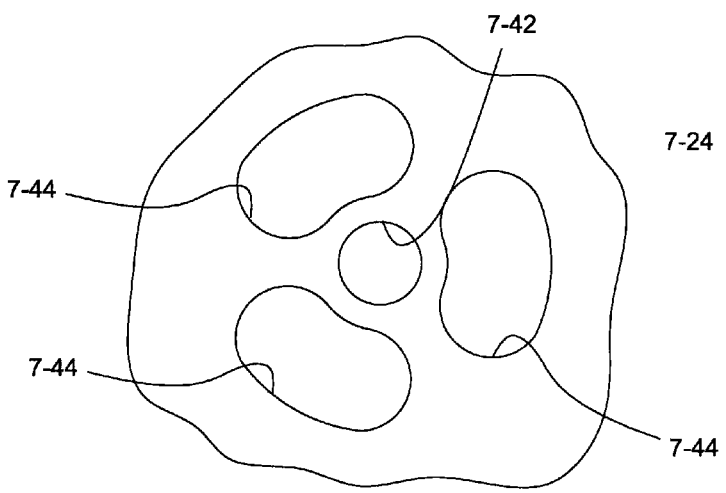
FIG. 8B is a plan view of the slots formed in the muffler plate according to the principles of the present disclosure.

With reference to FIGS. 8A-8B, the valve assembly 8-10, as shown is substantially the same as the valve assembly 7-10 as discussed above, with the exception that the valve member 8-18 further includes a centrally disposed axially extending lug 8-20 which is received in a recess 8-22 provided in the end of the retainer 8-24. The lug 8-20 includes radially extending fingers 8-26 which are engaged by shoulder portion 8-28 in the opening 8-22 of the retainer 8-24.

Figure 15A:
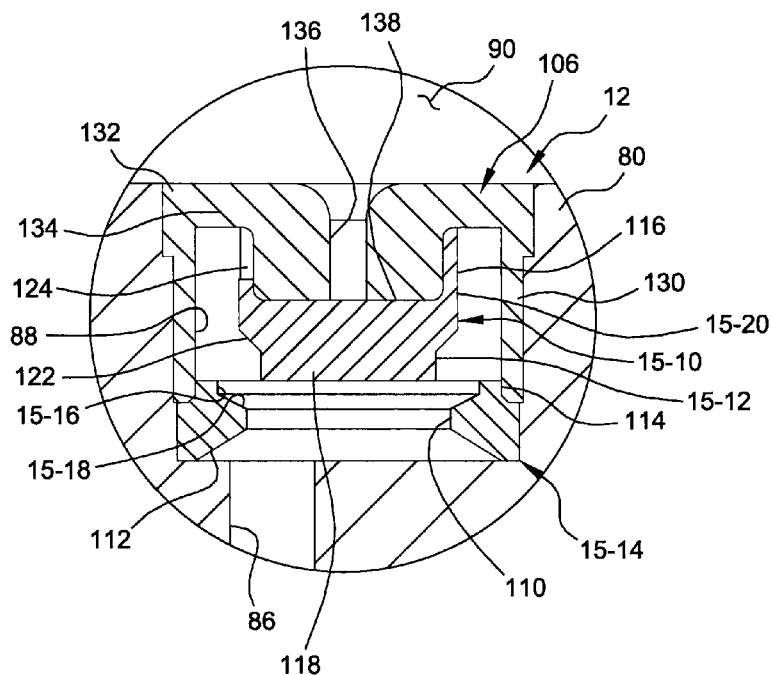
FIG. 15A is a cross-sectional view of a discharge valve according to an alternative embodiment of the present disclosure with the valve member being shown in a fully open position.
Figure 15B:
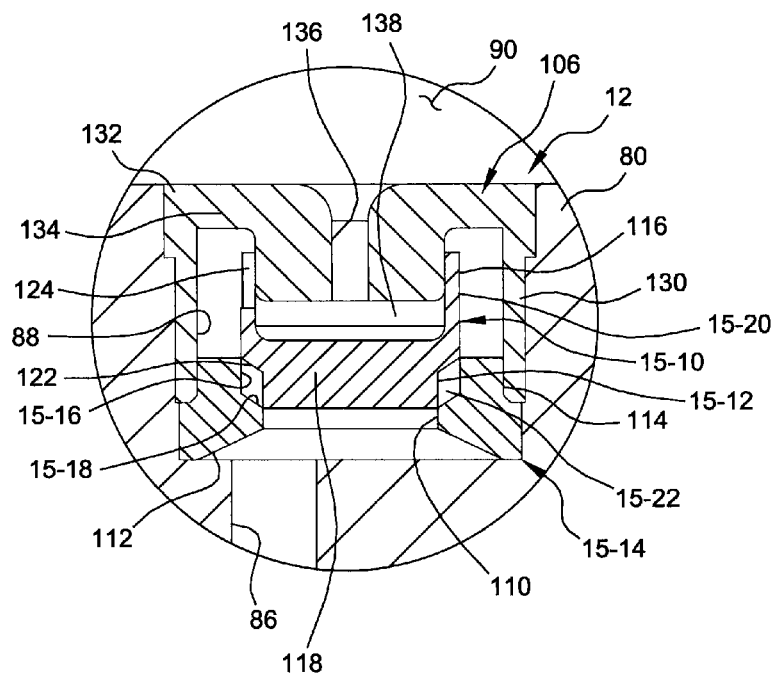
FIG. 15B is a cross-sectional view of the discharge valve shown in FIG. 15A, with the valve member being shown in a partially closed position.
Figure 15C:
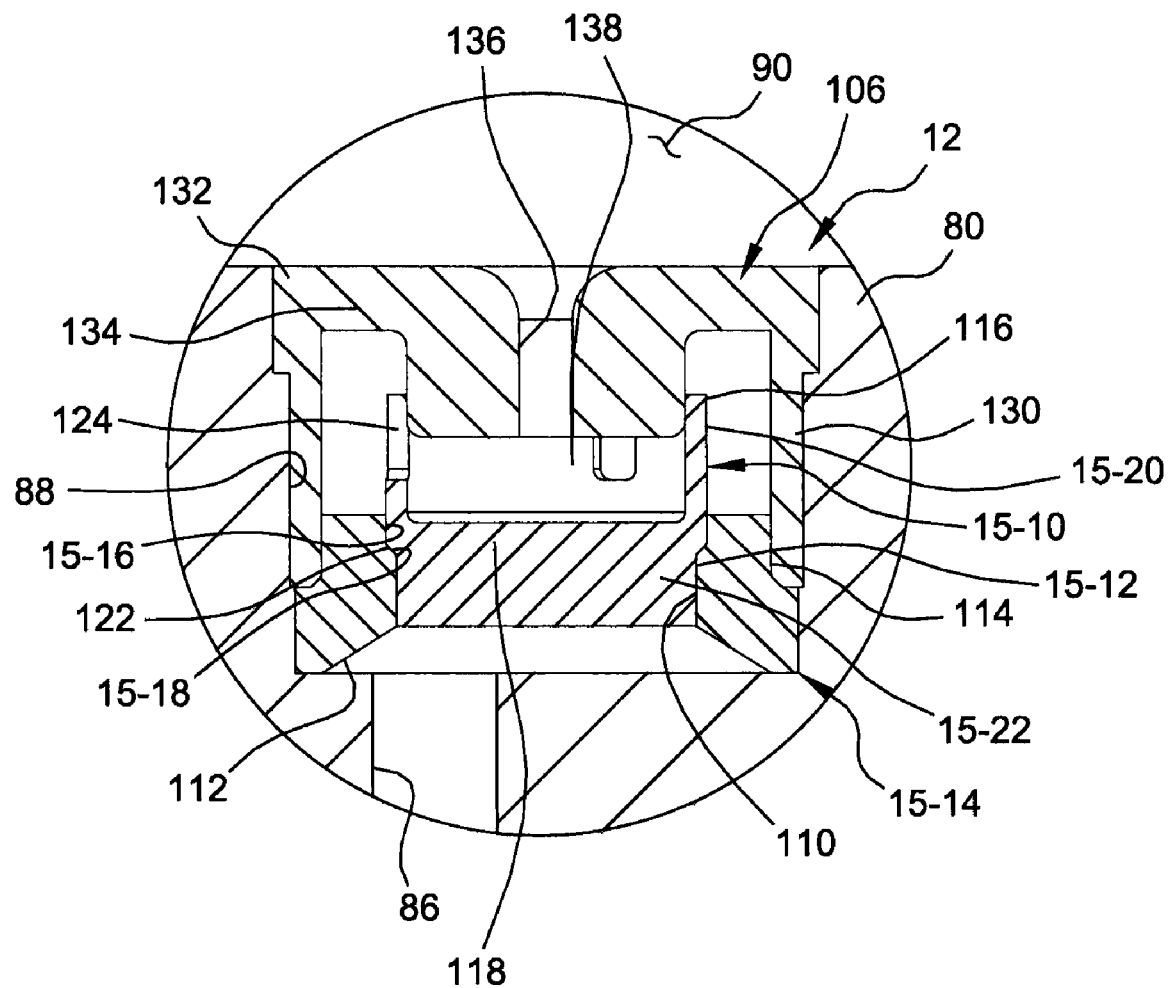
FIG. 15C is a cross-sectional view of the discharge valve shown in FIG. 15A, with the valve member being shown in a fully seated position.

With reference to FIGS. 15A-15C, wherein common reference numerals are used to represent common elements as disclosed in FIGS. 2 and 3, the valve member 15-10 includes a generally cylindrical section 15-12 at the bottom of the valve member 15-10 which engages with the cylindrical surface 110 of the valve seat 15-14 with a controlled clearance therebetween when the valve member 15-10 is approaching the valve seat 15-14. The valve seat 15-14 includes a cylindrical surface 15-16 on top of the conically shaped valve seat surface 15-18, which engages with the outer cylindrical surface 15-20 of the valve member 15-10 when the valve member 15-10 is approaching the seat 15-14. As a result, when the cylindrical surfaces 15-12, 110; 15-16, 15-20 engage, a seat damper cavity 15-22, as shown in FIG. 15B, is formed. When the valve member 15-10 is approaching the valve seat 15-14 and the cavity 15-22 is formed, gas pressure in the cavity 15-22 is increasing due to its volume reduction and flow restriction for the gas to escape through the clearances between respective cylindrical surfaces 15-12, 110; 15-16, 15-20. Elevation of gas pressure in the seat damper cavity 15-22 reduces the valve member velocity during valve closing, reducing the impact velocity of the valve 15-10 and seat 15-14 engagement, therefore reducing impact induced stresses, improving reliability of the valve and compressor sound characteristics.

Figure 16A:
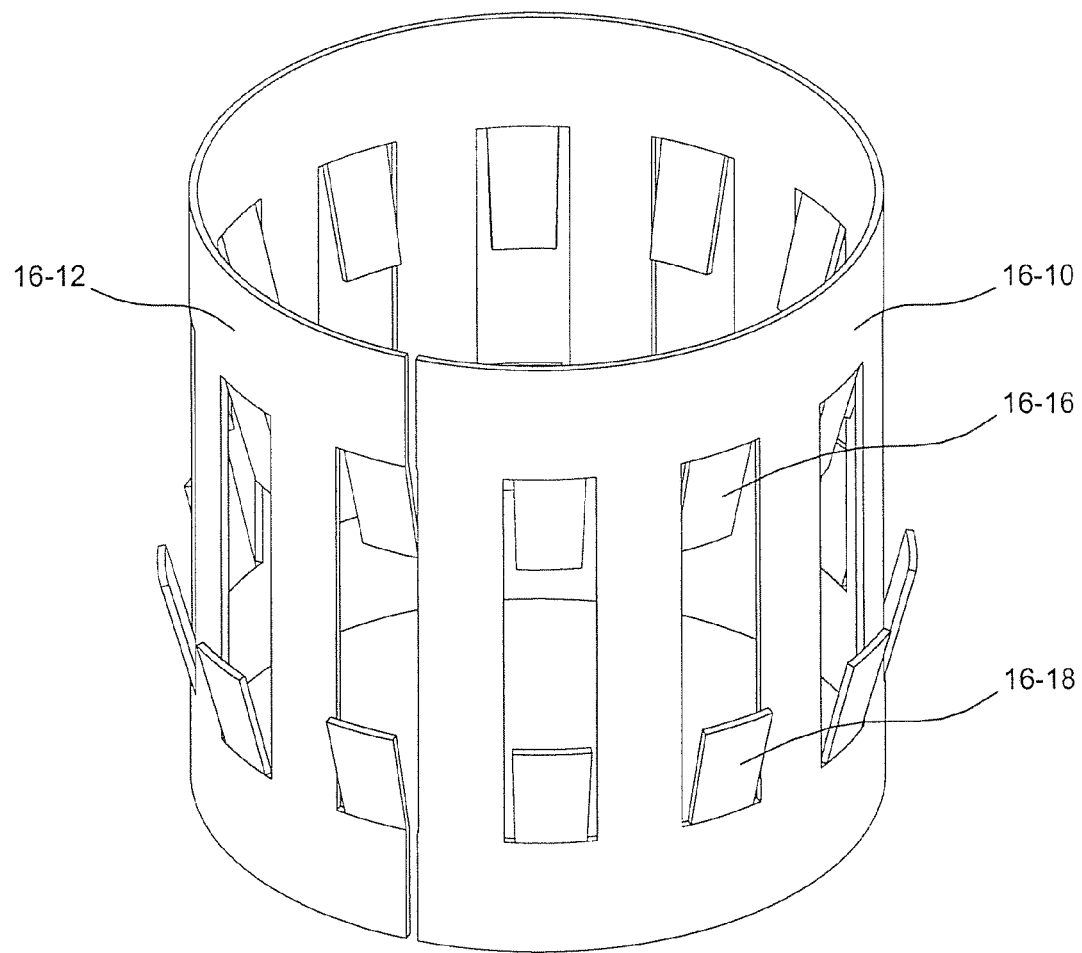
FIG. 16A is a perspective view of a valve retainer according to one example of the present disclosure.
Figure 16B:
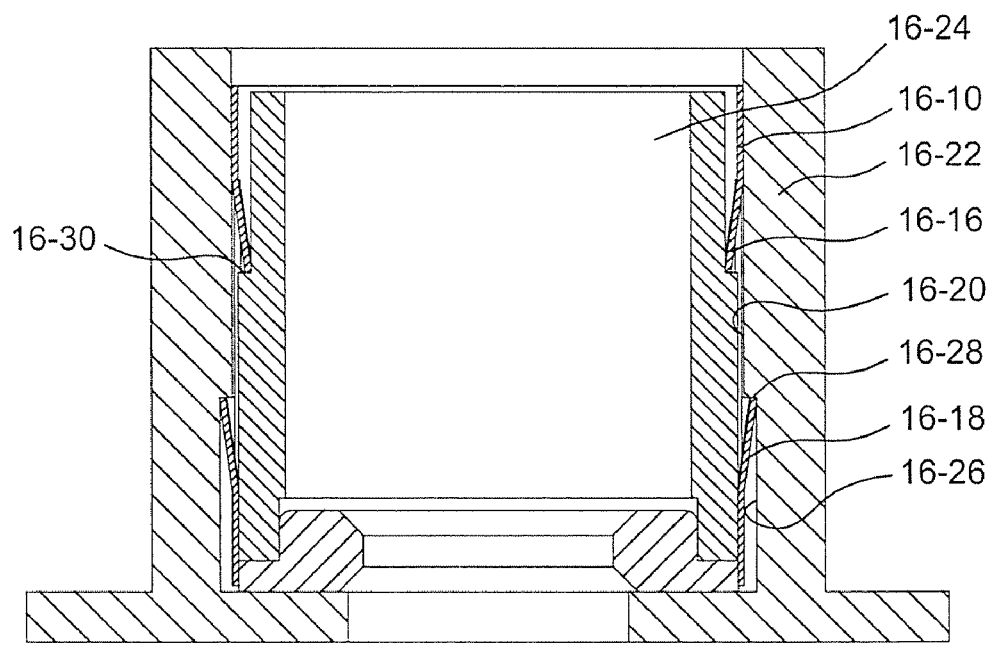
FIG. 16B is a cross-sectional view of the valve retainer of FIG. 16A shown in an installed position between a valve member and a recess formed in a scroll according to one example of the present disclosure.

With reference now to FIGS. 16A and 16B, a valve retainer 16-10 according to a first example is shown. The valve retainer 16-10 generally defines a ring-like body 16-12 having a first plurality of inwardly extending tangs 16-16 and a second plurality of outwardly extending tangs 16-18 formed thereon. In one example, the valve retainer 16-10 may be formed of spring steel having 65% Mn and a thickness of 0.32 mm. Those skilled in the art will appreciate that other materials may be used.

As shown in FIGS. 16A and 16B, the first plurality and second plurality of tangs 16-16 and 16-18, respectively are offset from opposite ends of the ring-like body 16-12. In one example, the first and second plurality of tangs 16-16 and 16-18 are offset an equivalent distance from their respective end of the ring-like body 16-12.

In an installed position (FIG. 16B), the valve retainer 16-10 is securably positioned between a fixed scroll member 16-22 and a valve 16-24. In the installed position, the valve retainer 16-10 is shown disposed within a recess 16-20 formed in the fixed scroll member 16-22. The recess 16-20 includes a pocket 16-26 defining an annular ridge 16-28. The valve 16-24 includes an annular shoulder 16-30 defined thereon. As illustrated in FIG. 16B, the inwardly extending tangs 16-16 engage the annular shoulder 16-30 of the valve 16-24 while the outwardly extending tangs 16-18 engage the annular ridge 16-28 of the fixed scroll member 16-22. The cooperative engagement of the respective inwardly and outwardly extending tangs 16-16 and 16-18, respectively exert a biasing force onto their respective engaged surface to facilitate securement of the valve 16-24 to the fixed scroll member 16-22 in the installed position. In one example, the valve retainer 16-10 may achieve about 1200-2000 pound retention force in the installed position.

Figure 17:
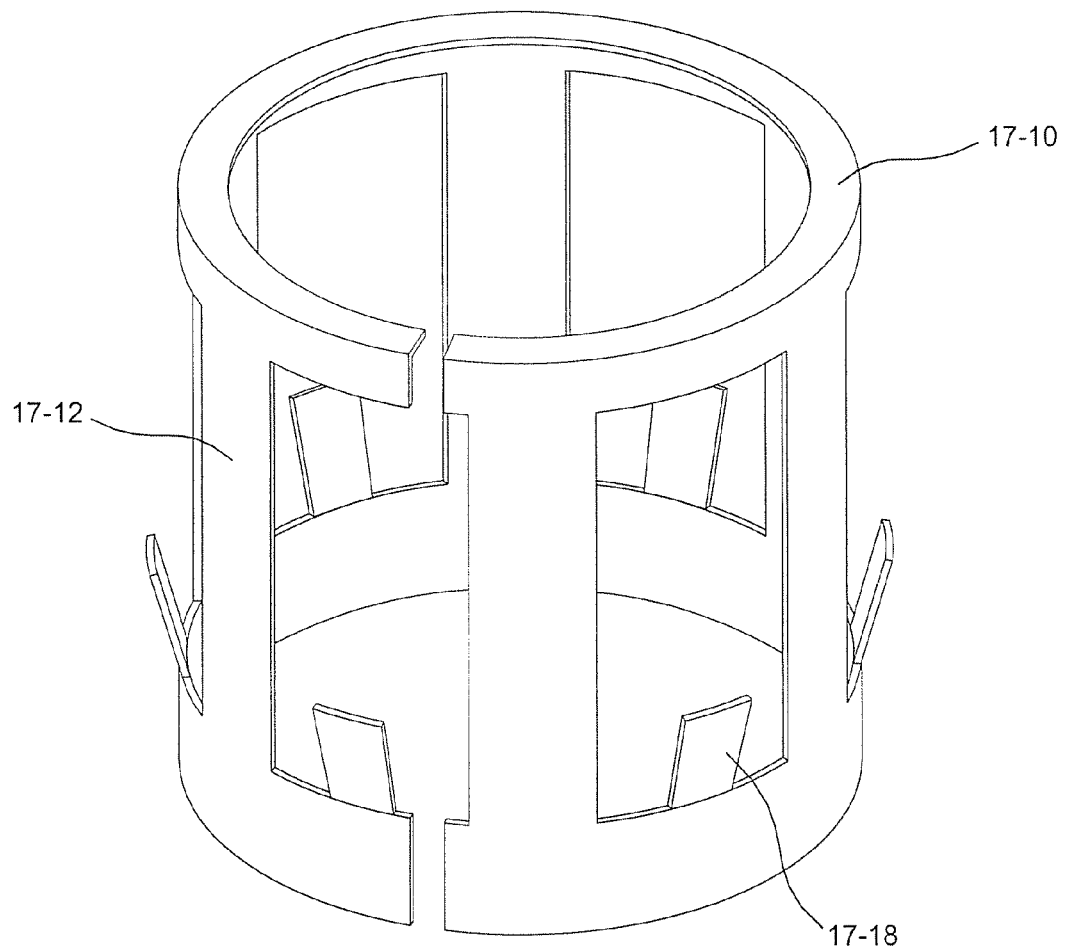
FIG. 17 is a perspective view of a valve retainer according to an alternative embodiment of the present disclosure.
Figure 18:
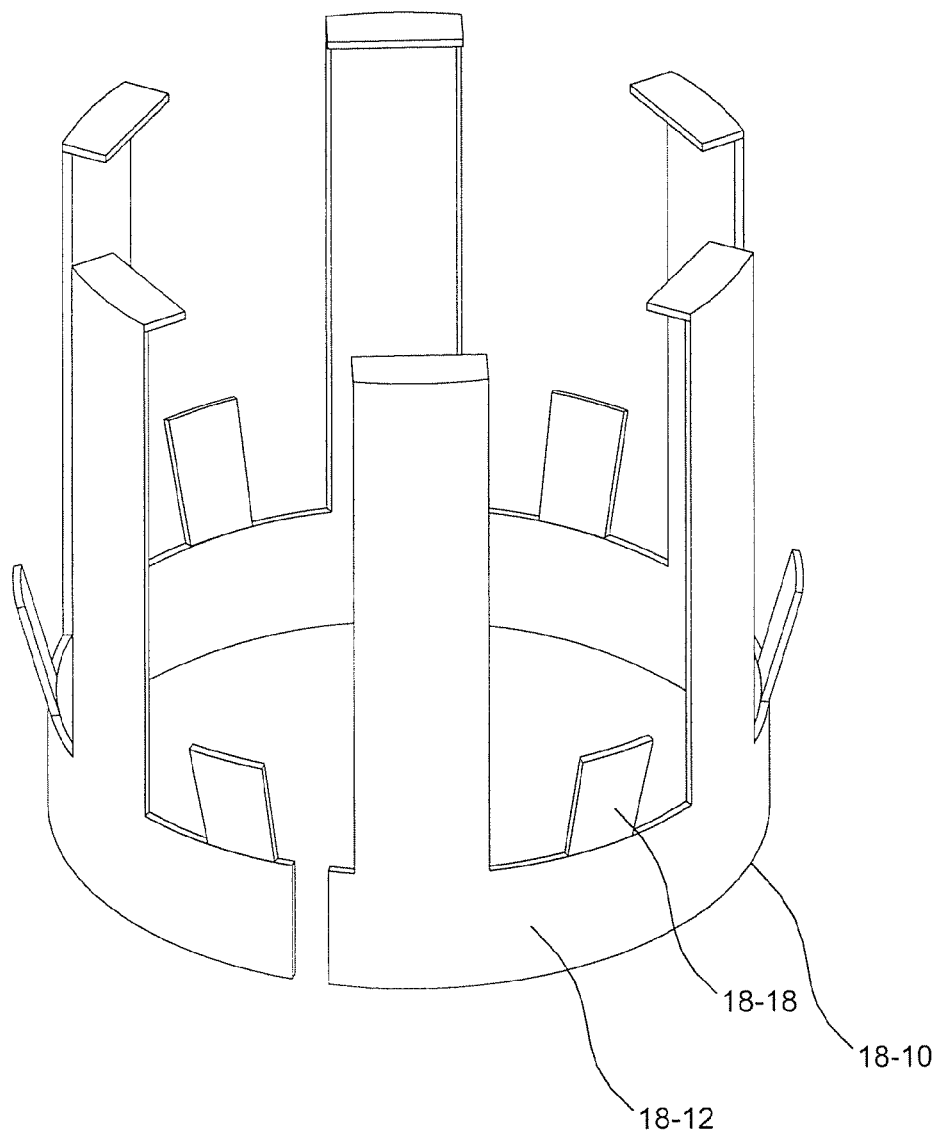
FIG. 18 is a perspective view of a valve retainer according to an alternative embodiment of the present disclosure.

With reference to FIG. 17, a valve retainer 17-10 according to another embodiment is shown. The valve retainer 17-10 generally defines a ring-like body 17-12 having a plurality of outwardly extending tangs 17-18 formed thereon. With reference to FIG. 18, a valve retainer 18-10 according to another embodiment is shown. The valve retainer 18-10 generally defines a ring-like body 18-12 having a plurality of outwardly extending tangs 18-18 formed thereon.

Figure 19A:
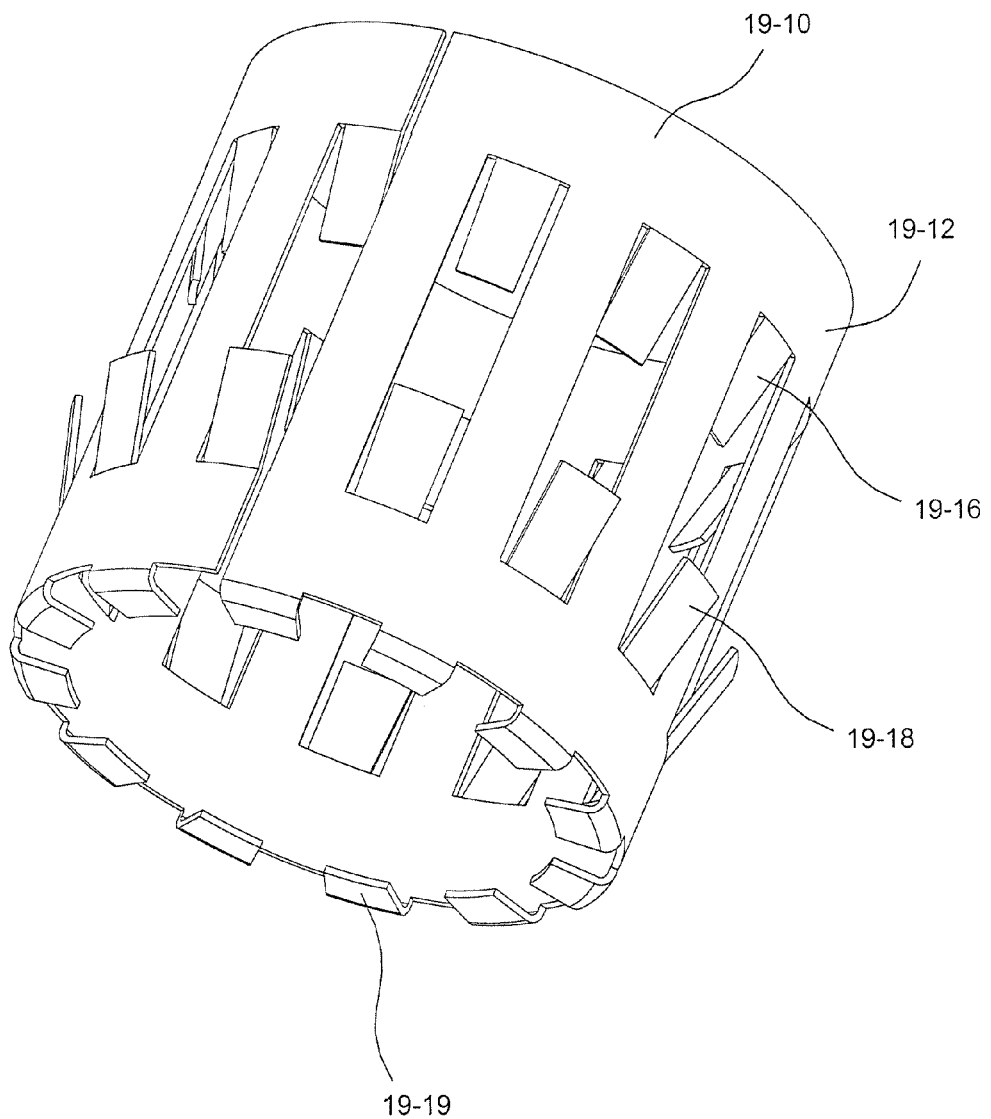
FIG. 19A is a perspective view of a valve retainer according to an alternative embodiment of the present disclosure.
Figure 19B:
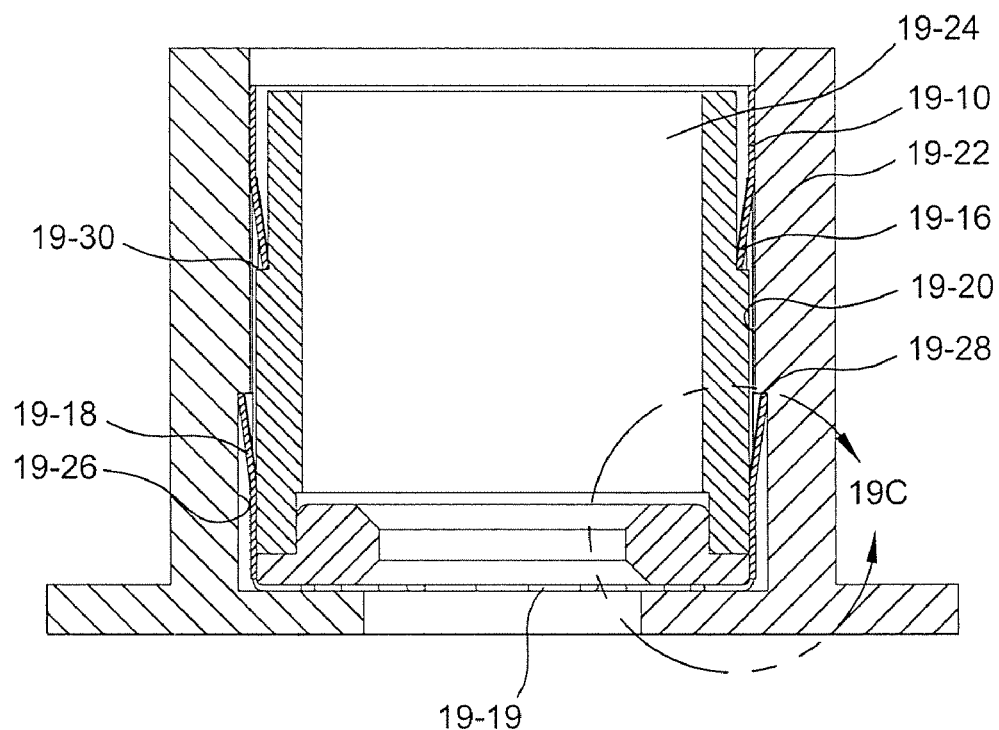
FIG. 19B is a cross-sectional view of the valve retainer of FIG. 19A shown in an installed position between a valve member and a recess formed in a scroll according to one example of the present disclosure.

With reference now to FIGS. 19A and 19B, a valve retainer 19-10 according to another embodiment is shown. The valve retainer 19-10 generally defines a ring-like body 19-12 having a first plurality of inwardly extending tangs 19-16 and a second plurality of outwardly extending tangs 19-18 formed thereon. A plurality of downwardly extending tangs 19-19 may be formed around a distal rim portion of the body 19-12.

Figure 19C:
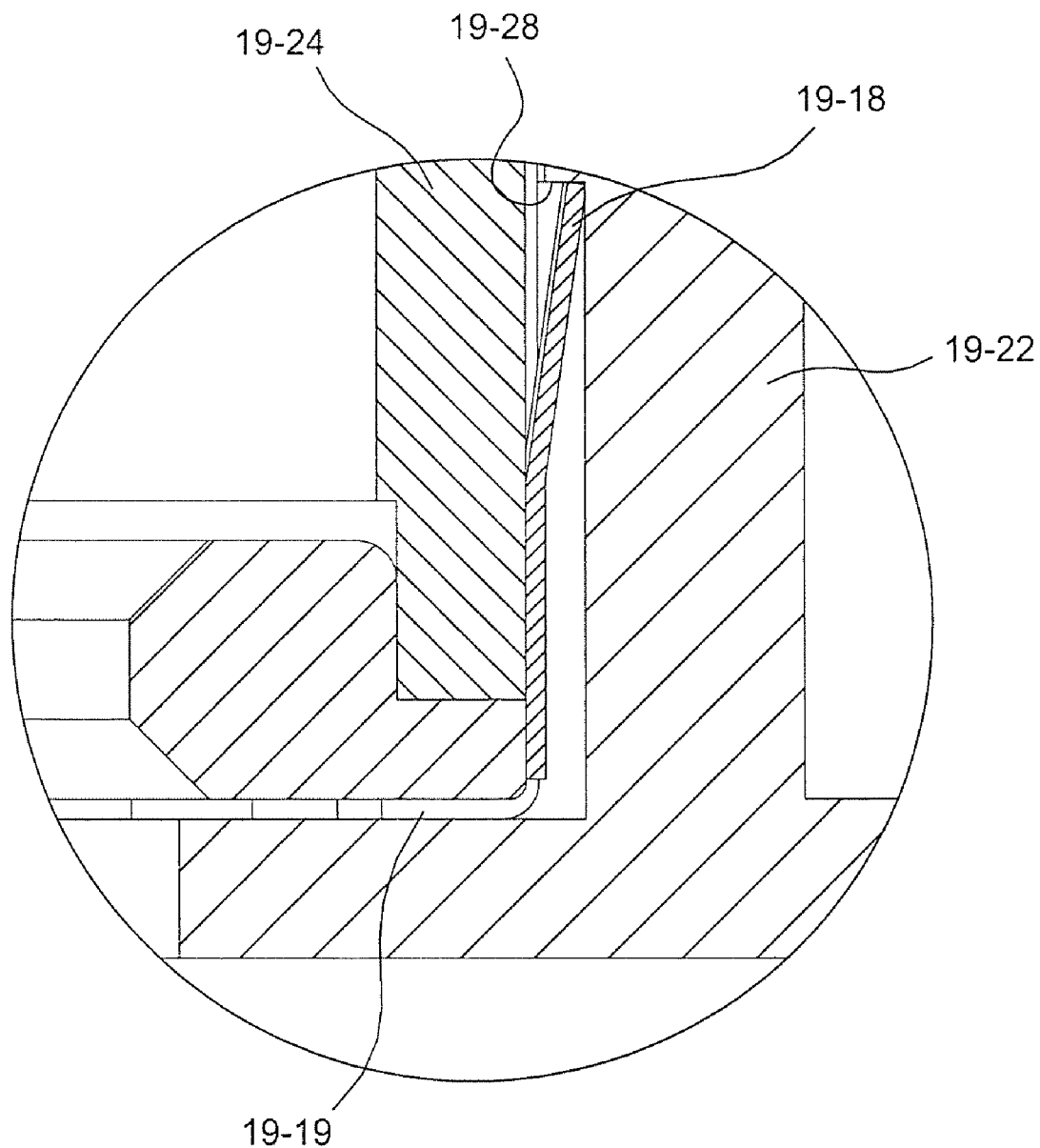
FIG. 19C is a detailed view of a portion of the valve retainer shown in FIG. 19B.

In an installed position (FIGS. 19B and 19C), the valve retainer 19-10 is securably positioned between a fixed scroll member 19-22 and a valve 19-24. In the installed position, the valve retainer 19-10 is shown disposed within a recess 19-20 formed in the fixed scroll member 19-22. The recess 19-20 includes a pocket 19-26 defining an annular ridge 19-28. The valve 19-24 includes an annular shoulder 19-30 defined thereon. As illustrated in FIGS. 19B and 19C, the inwardly extending tangs 19-16 engage the annular shoulder 19-30 of the valve 19-24 while the outwardly extending tangs 19-18 engage the annular ridge 19-28 of the fixed scroll member 16-22. The downwardly extending tangs 19-19 engage a terminal surface of the recess 19-20. The cooperative engagement of the respective inwardly, outwardly and downwardly extending tangs 19-16, 19-18 and 19-19, respectively, exert a biasing force onto their respective engaged surface and facilitate securement the valve 19-24 to the fixed scroll member 19-22 in the installed position.

Figure 20A:
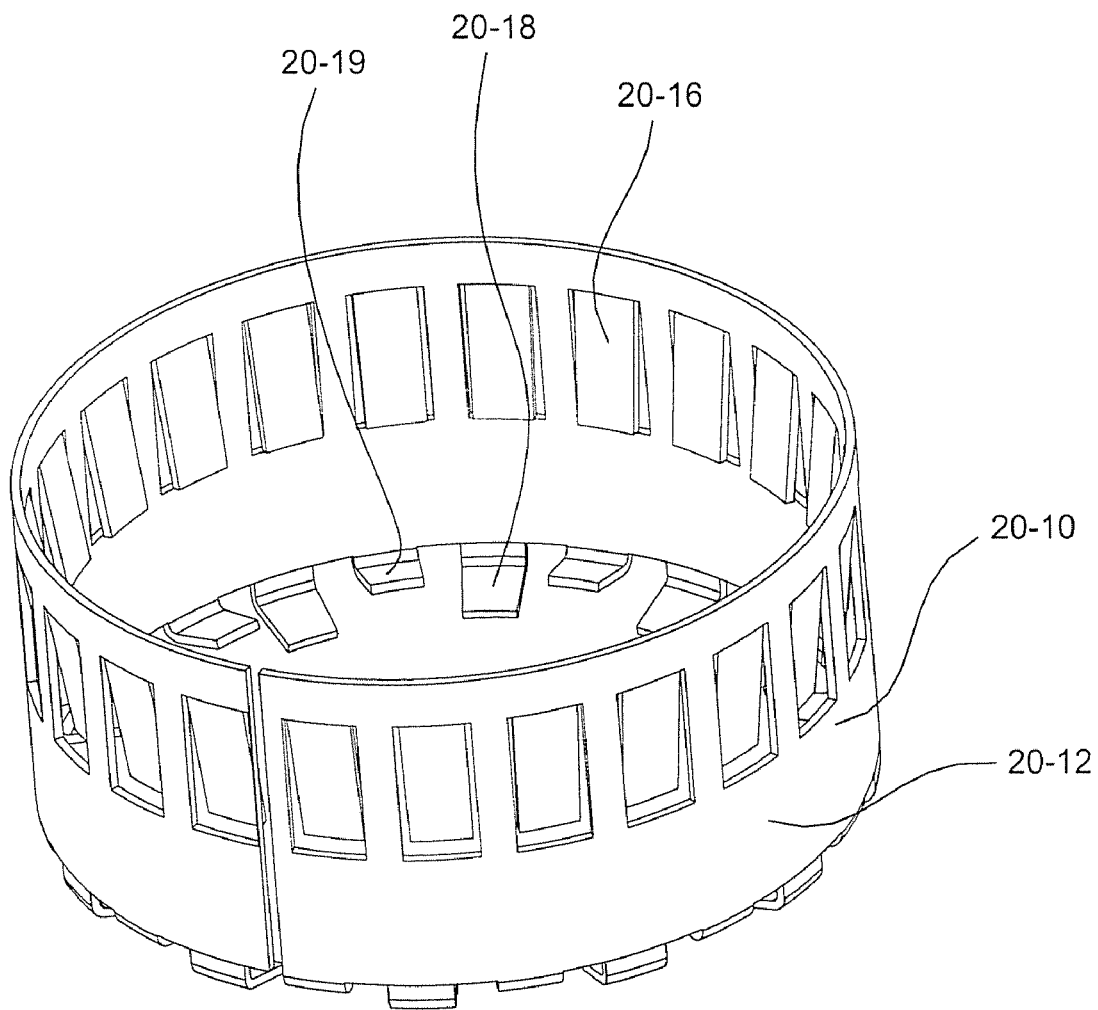
FIG. 20A is a perspective view of a valve retainer according to an alternative embodiment of the present disclosure.
Figure 20B:
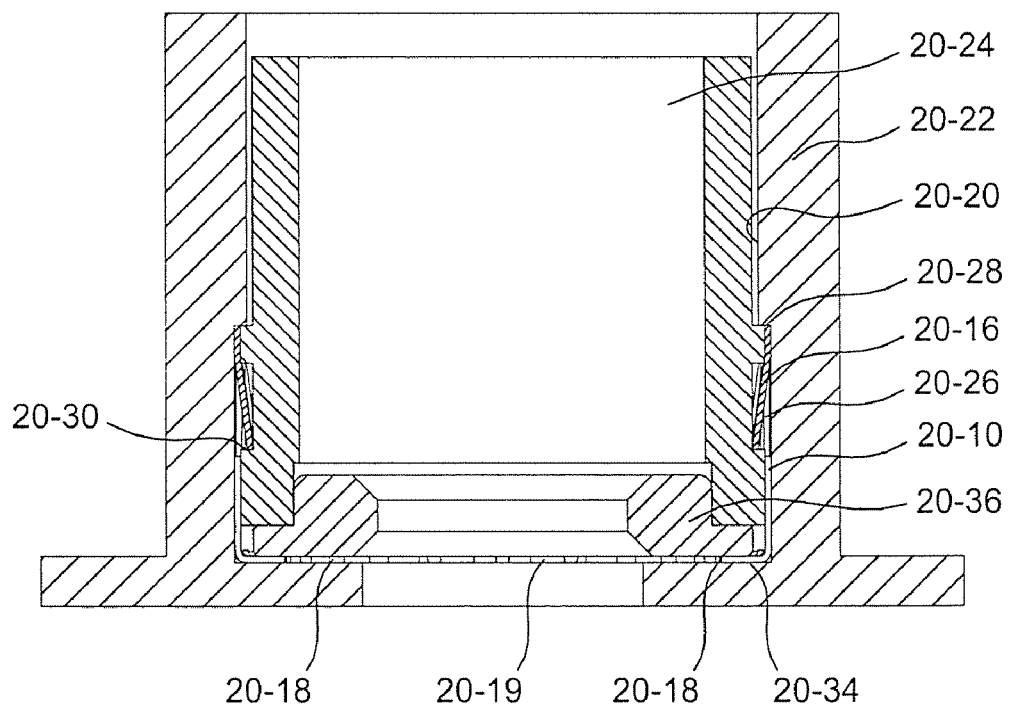
FIG. 20B is a cross-sectional view of the valve retainer of FIG. 20A shown in an installed position between a valve member and a recess formed in a scroll according to one example of the present disclosure.

With reference now to FIGS. 20A and 20B, a valve retainer 20-10 according to another embodiment is shown. The valve retainer 20-10 generally defines a ring-like body 20-12 having a first plurality of inwardly extending tangs 20-16. A second plurality of inwardly extending tangs 20-18 may be formed around a distal rim portion of the body 20-12 and angled away from the interior volume. A third plurality of inwardly extending tangs 20-19 may be formed around the distal rim portion of the body 20-12 and angled toward the interior volume. More specifically, the second plurality of inwardly extending tangs 20-18 can extend at an angle downwardly relative to a plane transverse to an axis defined by the retainer 20-10. Similarly, the third plurality of inwardly extending tangs 20-19 can extend at an angle upwardly relative to the transverse plane. Generally, the ring-like body 20-12 includes three pluralities of inwardly extending tangs with each plurality oriented at a different angle from another. In one example, the downwardly and upwardly extending tangs 20-18 and 20-19, respectively, may be alternatively arranged around the distal rim of the body 20-12.

In an installed position (FIG. 20B), the valve retainer 20-10 is securably positioned between a fixed scroll member 20-22 and a valve 20-24. In the installed position, the valve retainer 20-10 is shown disposed within a recess 20-20 formed in the fixed scroll member 20-22. The recess 20-20 includes a pocket 20-26 defining an annular ridge 20-28. The valve 20-24 includes an annular shoulder 20-30 defined thereon. As illustrated in FIG. 20B, the inwardly extending tangs 20-16 engage the annular shoulder 20-30 of the valve 20-24. The inwardly extending tangs 20-18 engage a scroll base 20-34 of the fixed scroll member 20-22. The inwardly extending tangs 20-18 can provide a proof load between the scroll base 20-34 and the annular ridge 20-28 of the fixed scroll member 20-22. The inwardly extending tangs 20-19 engage a valve plate 20-36. The inwardly extending tangs 20-19 can provide a proof load between the valve plate 20-36 and the valve 20-24. The cooperative engagement of the respective inwardly extending tangs 20-16, 20-18 and 20-19, respectively, exert a biasing force onto their respective engaged surface and facilitate securement the valve 20-24 to the fixed scroll member 20-22 in the installed position.

In one method of installation, the valve retainer 20-10 can be pressed into the fixed scroll member 20-22. As described above, the valve retainer 20-10 can be retained into the fixed scroll member 20-22 by a combination of radial forces generated by the valve retainer 20-10 and axial forces provided from the inwardly extending tangs 20-18. Once the valve retainer 20-10 is advanced into a retained position, the valve 20-24 can then be pressed into the fixed scroll member 20-22. Again, the inwardly extending tangs in cooperation with the inwardly extending tangs 20-16 can provide proof load to maintain the valve 20-24 substantially static during running conditions of the compressor 10. The valve 20-24 can be retained by the inwardly extending tangs 20-16.

Figure 21A:
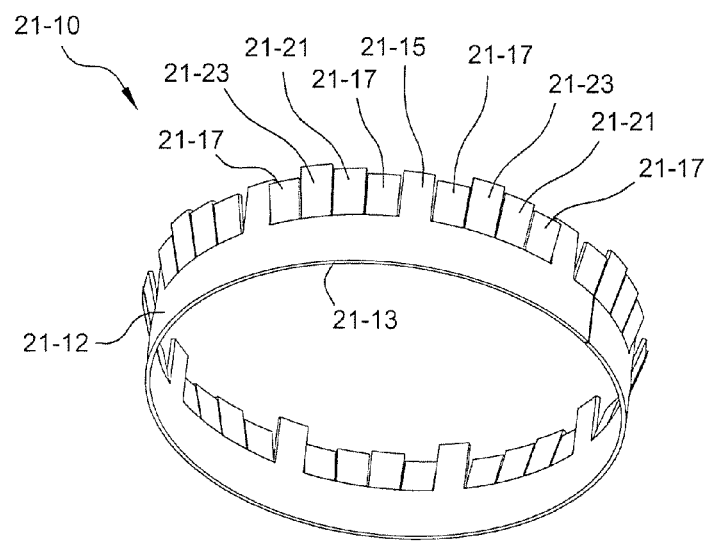
FIG. 21A is a perspective view of a valve retainer according to an alternate embodiment of the present disclosure.
Figure 21B:
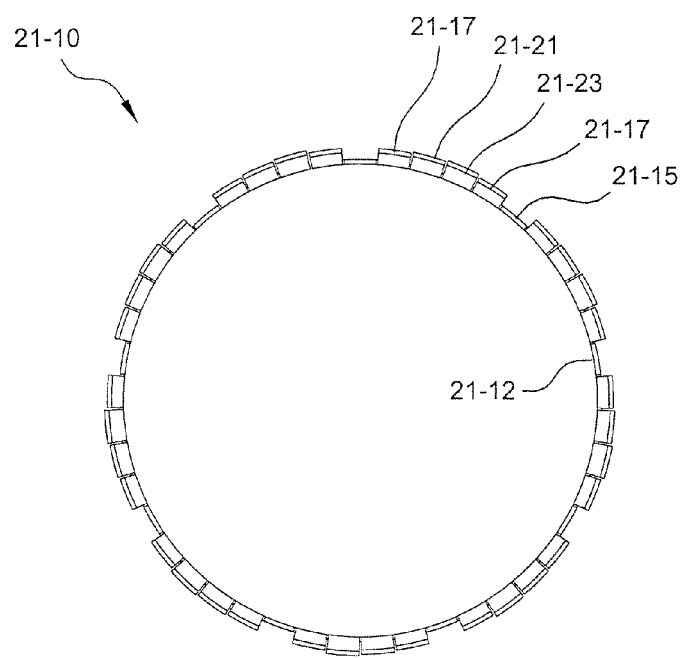
FIG. 21B is a bottom view of the valve retainer of FIG. 21A.
Figure 21C:
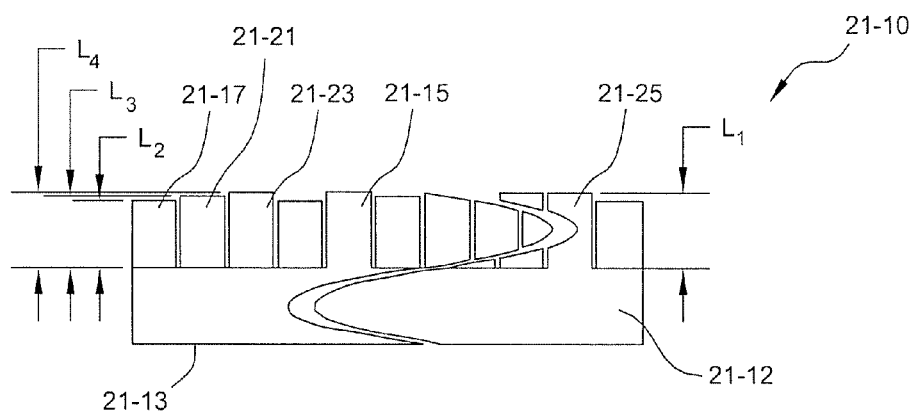
FIG. 21C is a fragmented illustration of an the valve retainer of FIG. 21A in an unwrapped state.
Figure 21D:
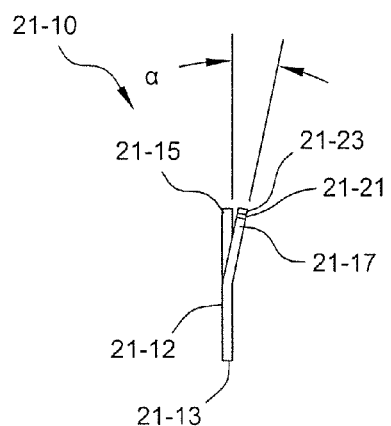
FIG. 21D is a side view of the unwrapped valve retainer of FIG. 21C.

With reference to FIGS. 21A-21D, a valve retainer 21-10 according to another embodiment is shown. The valve retainer 21-10 generally defines a ring-like body 21-12 having a lower end 21-13. The body 21-12 has a first plurality of upwardly extending tangs 21-15 that are generally axially aligned with the body 21-12. A second plurality of tangs 21-17 may be formed around the upper rim portion of the body 21-12 and may extend radially outwardly as they extend axially upwardly. A third plurality of tangs 21-21 may be formed around the upper rim portion of the body 21-12 and may extend radially outwardly as they extend axially upwardly. A fourth plurality of tangs 21-23 may be formed around the upper rim portion of the body 21-12 and may extend radially outwardly as they extend axially upwardly. As shown in FIG. 21D, second, third and fourth pluralities of tangs 21-17, 21-21, and 21-23 may extend radially outwardly at an angle $\alpha$ relative to the body 21-12 and the first plurality of tangs 21-15. In one example, angle $\alpha$ can be eleven degrees. In one example, the first, second, third and fourth pluralities of tangs 21-15, 21-17, 21-21, and 21-23 may be alternatively arranged around the upper rim portion of the body 21-12.

The valve retainer 21-10 may be configured to fit within an annular recess in an exterior surface of a discharge valve. The lower end 21-13 and the first plurality of tangs 21-15 may engage with the axially opposed shoulders of the annular recess in the exterior surface of the discharge valve. The engagement of the lower end 21-13 and the first plurality of tangs 21-15 axially secures valve retainer 21-10 to the discharge valve. In one example, the first plurality of tangs 21-15 can have an axial length $L_1$ that is dimensioned to allow valve retainer 21-10 to have an axial length that is complementary to the axial length of the annular groove in the exterior of the discharge valve.

Second, third and fourth pluralities of tangs 21-17, 21-21 and 21-23 can have differing axial lengths as best seen in FIGS. 21C and 21D. In one example, each of the pluralities of tangs 21-17, 21-21, and 21-23 may have axial lengths that are different than one another. In one example, the second plurality of tangs 21-17 may have an axial length $L_2$, the third plurality of tangs 21-21 may have an axial length $L_3$, and the fourth plurality of tangs 21-23 may have an axial length $L_4$ with lengths $L_2$, $L_3$ and $L_4$ being different from one another. In one example, length $L_1$ may be less than length $L_2$ which may be less than length $L_3$.

The outwardly extending pluralities of tangs 21-17, 21-21, 21-23 may engage with an annular ridge in a pocket of a recess in a fixed scroll member to retain a discharge valve therein. The differing axial lengths of the pluralities of tangs 21-17, 21-21, 21-23 may accommodate differences in the position or tolerance of the location of the annular ridge in the recess of the fixed scroll member and the annular recess in the discharge valve, as described below.

In one method of installation, the valve retainer 21-10 can be snap-fitted into an annular recess in an exterior of a discharge valve with the lower end 21-13 and the first plurality of tangs 21-15 engaging with the respective lower and upper shoulders of the annular recess. With the valve retainer 21-10 secured to the discharge valve, the valve retainer 21-10 and the discharge valve can be inserted into the recess of the fixed scroll member. As the discharge valve and the valve retainer 21-10 are inserted into the recess, the second plurality of tangs 21-17 (the shortest ones in the embodiment shown) will engage first with the annular ridge in the fixed scroll member. If this position corresponds to the discharge valve being fully seated within the fixed scroll member, the valve retainer 21-10 thereby retains the discharge valve in the fixed scroll member with the bottom end of the discharge valve and the second plurality of tangs 21-17 axially securing the discharge valve therein.

If the discharge valve is not yet fully seated, the discharge valve and the valve retainer 21-10 can be further inserted into the fixed scroll member wherein the third plurality of tangs 21-21 (the intermediate length tangs in the embodiment shown) will next engage with the annular ridge of the fixed scroll member. If this position corresponds to the discharge valve being fully seated, the discharge valve and the valve retainer 21-10 will then be axially secured in the fixed scroll member through the engagement of the bottom end of the discharge valve and the third plurality of tangs 21-21.

If the discharge is not yet fully seated, the discharge valve and the valve retainer 21-10 can be further inserted into the fixed scroll member wherein the fourth plurality of tangs 21-23 (the longer tangs in the embodiment shown) will engage with the annular ridge of the fixed scroll member. The discharge valve and valve retainer 21-10 will thereby be axially secured within the fixed scroll member with the engagement of the bottom of the discharge valve and the fourth plurality of tangs 21-23.

In this manner, the second, third and fourth plurality of tangs 21-17, 21-21, and 21-23 having varying axial lengths can be utilized to accommodate tolerances in the location of the annular ridge of the fixed scroll member and/or of the annular recess in the discharge valve within which valve retainer 21-10 is secured. In one example, the outwardly extending tangs may have three distinct axial lengths. It should be appreciated that a greater or lesser number of plurality of tangs of varying lengths may be employed to accommodate differences in tolerance.

The description of the disclosure is merely exemplary in nature and, thus, variations that do not depart from the gist of the disclosure are intended to be within the scope of the disclosure. Such variations are not to be regarded as a departure from the spirit and scope of the disclosure.

What is claimed is:

1. A valve retainer for securing a discharge valve assembly in a compressor, comprising:
   the valve retainer connected between the discharge valve and a compressor unit of the compressor;
   the valve retainer comprising:
   a ring shaped body defining a central axis and a first and a second annular end;
   a first plurality of tangs inwardly extending from the ring shaped body;
   a second plurality of tangs formed at the first annular end and extending inwardly therefrom; and
   a third plurality of tangs alternately formed at the first annular end with the second plurality of tangs, wherein the tangs of the second plurality of tangs are formed at a first angle relative to the ring shaped body and the tangs of the third plurality of tangs are formed at a second angle relative to the ring shaped body, the first and second angles being distinct.

2. The valve retainer of claim 1 wherein each of the tangs of the second plurality of tangs form an acute angle with the ring shaped body and wherein each of the tangs of the third plurality of tangs form an obtuse angle with the ring shaped body.

3. The valve retainer of claim 1 wherein the first plurality of tangs are formed on the ring shaped body in an area offset from the second and third plurality of tangs toward the second annular end.

4. The valve retainer of claim 1 wherein the first plurality of tangs are adapted to cooperatively engage structure defined on the discharge valve assembly and the second plurality of tangs are adapted to cooperatively engage structure defined on the compressor, wherein the cooperative engagement of the first and second plurality of tangs resists withdrawal of the discharge valve assembly.

5. The valve retainer of claim 1 wherein the compressor is a scroll compressor and the discharge valve assembly is on a scroll of the scroll compressor.

6. A method of positioning a discharge valve assembly relative to a scroll compressor structure using a valve retainer, the valve retainer comprising a ring shaped body defining a central axis and a first and a second annular end, a first plurality of tangs inwardly extending from the ring shaped body, and a second plurality of tangs formed at the first annular end and extending inwardly therefrom, the method comprising:
    locating the valve retainer into a recess defined by the scroll compressor structure wherein the first annular end is captured under an annular ridge defined by a scroll; and
    locating the discharge valve assembly into the recess of the scroll compressor structure wherein the first plurality of tangs formed at the second annular end provide a load between the discharge valve assembly and the scroll compressor structure to resist withdrawal of the discharge valve assembly from the scroll.

7. The method of claim 6 wherein locating the discharge valve assembly into the recess includes positioning the second plurality of tangs that inwardly extend from the ring shaped body into engagement with an annular shoulder of the discharge valve assembly, and wherein the scroll compressor structure includes a scroll member.

8. The method of claim 6 wherein the ring shaped body defines an interior volume and the first plurality of tangs define alternating tangs extending toward and away from the interior volume and wherein locating the discharge valve assembly includes locating the discharge valve assembly into the interior volume of the ring-like body.

9. A valve retainer for securing a discharge valve assembly in a compressor, comprising:
    the valve retainer connected between the discharge valve and a compressor unit of the compressor;
    the valve retainer comprising:
        a ring shaped body defining a central axis and a first and a second annular end;
        a first plurality of tangs extending from the ring shaped body in a direction toward the central axis;
        a second plurality of tangs formed at the first annular end and extending in a direction toward the central axis and forming an acute angle with the ring shaped body; and
        a third plurality of tangs formed at the first annular end and extending in a direction toward the central axis and away from the second annular end forming an obtuse angle with the ring shaped body.

10. The valve retainer of claim 9 wherein the second and third pluralities of tangs are alternately formed around the first annular end.

11. The valve retainer of claim 9 wherein the ring shaped body defines an interior volume and wherein the tangs of the second plurality of tangs are angled toward the interior volume and wherein the tangs of the third plurality of tangs are angled away from the interior volume.

12. The valve retainer of claim 9 wherein the compressor is a scroll compressor and the discharge valve assembly is on a scroll of the scroll compressor.

13. The valve retainer of claim 12 wherein the first plurality of tangs are adapted to cooperatively engage structure defined on the discharge valve assembly and the second plurality of tangs are adapted to cooperatively engage structure defined on the scroll, wherein the cooperative engagement of the first and second plurality of tangs resists withdrawal of the discharge valve assembly.

14. A valve retainer for securing a discharge valve assembly in a compressor, comprising:
    a ring shaped body defining a central axis and a first and a second annular end;
    a first plurality of tangs inwardly extending from the ring shaped body; and
    a second plurality of tangs formed at one of the first and second annular ends and extending inwardly therefrom;
    wherein the first plurality of tangs are adapted to cooperatively engage structure defined on the discharge valve assembly and the second plurality of tangs are adapted to cooperatively engage structure defined on the compressor, wherein the cooperative engagement of the first and second plurality of tangs resists withdrawal of the discharge valve assembly.

15. The valve retainer of claim 14 wherein the compressor is a scroll compressor and the discharge valve assembly is on a scroll of the scroll compressor.

* * * * *

UNITED STATES PATENT AND TRADEMARK OFFICE
CERTIFICATE OF CORRECTION

PATENT NO. : 8,052,406 B2  Page 1 of 1
APPLICATION NO. : 11/939886
DATED : November 8, 2011
INVENTOR(S) : Feng E. Li et al.

It is certified that error appears in the above-identified patent and that said Letters Patent is hereby corrected as shown below:

| | |
|---|---|
| Column 2, Line 64 | After "of" delete "an". |
| Column 4, Line 11 | "disposed" should be --disclosed--. |
| Column 4, Line 12 | "No." should be --Nos.--. |
| Column 8, Line 28 | After "securement" insert --of--. |
| Column 9, Line 2 | After "securement" insert --of--. |

Signed and Sealed this
Eighth Day of May, 2012

David J. Kappos
*Director of the United States Patent and Trademark Office*